(12) United States Patent
Umezawa et al.

(10) Patent No.: US 7,438,804 B2
(45) Date of Patent: Oct. 21, 2008

(54) COAGULATION TREATMENT APPARATUS

(75) Inventors: Hiroyuki Umezawa, Ota (JP);
Masahiro Iseki, Kumagaya (JP); Daizo Takaoka, Ota (JP); Motoyuki Tsuihiji, Ota (JP); Koichi Hara, Gunma (JP)

(73) Assignee: Sanyo Electric Co., Ltd., Osaka (JP)

( * ) Notice: Subject to any disclaimer, the term of this patent is extended or adjusted under 35 U.S.C. 154(b) by 168 days.

(21) Appl. No.: 10/979,814

(22) Filed: Nov. 3, 2004

(65) Prior Publication Data
US 2005/0115908 A1 Jun. 2, 2005

(30) Foreign Application Priority Data
Nov. 6, 2003 (JP) ............... 2003-377495
Nov. 6, 2003 (JP) ............... 2003-377496
May 10, 2004 (JP) ............... 2004-140242
May 10, 2004 (JP) ............... 2004-140243

(51) Int. Cl.
*C02F 1/463* (2006.01)
(52) U.S. Cl. ............ 210/181; 204/660; 204/665; 205/752; 210/192; 210/195.1; 210/205
(58) Field of Classification Search ............. 210/717
See application file for complete search history.

(56) References Cited

U.S. PATENT DOCUMENTS

| | | | | |
|---|---|---|---|---|
| 3,192,142 A | * | 6/1965 | Vellas et al. | 205/701 |
| 3,664,951 A | * | 5/1972 | Armstrong | 210/707 |
| 3,767,046 A | * | 10/1973 | Hartkorn | 210/703 |
| 4,014,766 A | * | 3/1977 | Watanabe et al. | 205/746 |
| 4,802,991 A | * | 2/1989 | Miller | 210/705 |

(Continued)

FOREIGN PATENT DOCUMENTS

CN        1068089        1/1993

(Continued)

OTHER PUBLICATIONS

Chinese Office Action, dated Apr. 21, 2006, directed to corresponding Chinese Patent Application No. 2004100922922. 1 page.

(Continued)

*Primary Examiner*—Peter A. Hruskoci
(74) *Attorney, Agent, or Firm*—Morrison & Foerster LLP

(57) ABSTRACT

Provided are a coagulation treatment apparatus capable of removing fine objects of removal from a fluid containing the objects of removal, and a coagulation treatment method using the apparatus. A coagulation treatment apparatus for a fluid according to the present invention includes a production device for introducing ions of metal belonging to Group 8 of the periodic table into a fluid containing objects of removal and for producing a coagulated substance in which the objects of removal and the metal ions are bonded to each other. Moreover, a coagulation treatment apparatus of another embodiment includes: the production device for introducing ions of metal belonging to Group 8 of the periodic table into a fluid containing objects of removal and for producing a coagulated substance in which the objects of removal and the metal ions are bonded to each other; and the introduction device for coagulating the objects of removal by introducing the coagulated substance produced by the production device into the fluid.

21 Claims, 17 Drawing Sheets

U.S. PATENT DOCUMENTS

| | | | |
|---|---|---|---|
| 5,928,492 A * | 7/1999 | Corlett et al. | 205/742 |
| 6,080,300 A * | 6/2000 | Goodwin | 205/751 |
| 6,174,444 B1 * | 1/2001 | Smit | 210/709 |
| 6,312,601 B1 | 11/2001 | Allen et al. | |
| 6,645,366 B2 * | 11/2003 | Iseki et al. | 205/742 |
| 6,984,326 B2 * | 1/2006 | Iseki et al. | 210/631 |
| 7,014,770 B2 * | 3/2006 | Umezawa et al. | 210/636 |
| 7,018,543 B2 * | 3/2006 | Iseki et al. | 210/748 |
| 7,157,012 B2 * | 1/2007 | Umezawa et al. | 210/748 |
| 7,211,185 B2 * | 5/2007 | Powell | 204/673 |
| 7,396,458 B2 * | 7/2008 | Umezawa et al. | 210/195.2 |
| 2003/0121864 A1 * | 7/2003 | Kin et al. | 210/724 |

FOREIGN PATENT DOCUMENTS

JP     2003-290779     10/2003

OTHER PUBLICATIONS

Taiwanese Office Action, dated May 23, 2006, directed to corresponding Taiwanese Patent Application No. 93129812. 2 pages.

* cited by examiner

COAGULATION TREATMENT APPARATUS

BACKGROUND OF THE INVENTION

1. Field of the Invention

The present invention relates to a coagulation treatment apparatus, a coagulation treatment method, a coagulant, a coagulant production apparatus and a coagulant production method. More particularly, the present invention relates to the coagulation treatment apparatus, the coagulation treatment method, the coagulant, the coagulant production apparatus and the coagulant production method for performing treatment of wastewater containing fine objects of removal.

2. Description of the Related Art

Presently, the diminishing of the amount of industrial waste, separate collection and recycling of industrial waste, and prevention of release of industrial waste are considered to be ecologically-important topics and business issues as society moves towards the 21st Century. Some types of industrial waste comprise various types of fluids containing objects of removal; i.e., substances to be removed.

Such fluids are known by a variety of expressions, such as sewage, drainage, and effluent. Fluids, such as water or chemicals, containing substances that are objects of removal, shall be hereinafter referred to as "wastewater." The objects of removal are eliminated from wastewater by means of an expensive filtration system or a similar system. Wastewater is thereby recycled as a clean fluid, and the removed objects of removal or substances that cannot pass through the filtration system are disposed of as industrial waste. In particular, water is sent back to a natural setting, such as a river or sea, or recycled after being purified so as to meet environmental standards.

Adoption of such a filtration system is difficult because of costs incurred in constructing and running a filtration system, thus posing an environmental problem.

As can be seen from the above, wastewater treatment techniques are important in terms of recycling and prevention of environmental contamination, and immediate demand exists for a filtration system that incurs low initial and running costs.

By way of illustration, wastewater treatment as practiced in the field of semiconductors shall now be described. When a plate member formed, for example, from a metal, a semiconductor, or ceramic, is ground or abraded, an abrasion (or grinding) jig or the plate member is subject to a shower of a fluid, such as water, for preventing an increase in the temperature of the abrasion (or grinding) jig, which would otherwise be caused by friction, for improving lubricity, and for preventing adhesion of abrasion or grinding waste onto the plate member.

More specifically, in the process of dicing or back-grinding of plate-like semiconductor material; e.g., a semiconductor wafer, pure water is made to flow over the semiconductor wafer. In a dicing machine, a shower of pure water is made to flow over a semiconductor wafer, or pure water is squirted onto a dicing blade from a discharge nozzle in order to prevent an increase in the temperature of the blade or adhesion of dicing waste onto the semiconductor wafer. For the same reason, a flow of pure water is employed during an operation in which a semiconductor wafer is made thin by means of back-grinding.

Wastewater, which has mixed therein grinding or abrasion waste and is discharged from the dicing or back-grinding machine, is returned to a natural setting or recycled after having been purified through a filter. Alternatively, concentrated wastewater is recovered.

In a current process for manufacturing a semiconductor, wastewater, in which objects of removal (i.e., waste) primarily including Si are mixed, is disposed of according to either of two methods; i.e., a coagulating sedimentation method and a method, which employs a filter and a centrifugal separator in combination.

Under the coagulating sedimentation method, polyaluminum chloride (PAC) or aluminum sulfate ($Al_2(SO_4)_3$) is mixed in the wastewater as a coagulant to generate a reaction product with Si and the wastewater is filtrated to remove this reaction product.

Under the method that employs a filter and a centrifugal separator in combination, the wastewater is filtrated, the concentrated wastewater is processed by the centrifugal separator to recover the silicon waste as sludge, and the clear water resulting from filtration of the wastewater is released to a natural setting or is recycled.

For example, as shown in FIG. 17, wastewater discharged during a dicing operation is collected into a raw water tank 201 and is sent by a pump 202 to a filtration unit 203. A ceramic-based or an organic-based filter F is provided in the filtration unit 203, and the filtrated water is delivered via a pipe 204 to a collected water tank 205 for recycling. Alternatively, the filtrated water is released to a natural setting.

In the filtration unit 203, since clogging of the filter F occurs, washing is carried out periodically. For example, a valve B1 connected to the raw water tank 201 is closed, a valve B3 and a valve B2, for delivering washing water from the raw water tank are opened, and the filter F is cleaned by a reverse flow of water from the collected water tank 205. The resultant wastewater containing a high concentration of Si waste is returned to the raw water tank 201. Also, the concentrated water in a concentrated water tank 206 is transported via a pump 208 to a centrifugal separator 209 and is thereby separated into sludge and separated fluid. The sludge comprising Si waste is collected into a sludge recovery tank 210 and the separated fluid is collected into a separated-fluid tank 211. After further accumulation of the separated fluid, the wastewater in the separated-fluid tank 211 is transported to the raw water tank 201 via a pump 212.

These methods have also been employed for the recovery of waste resulting from grinding or abrasion of a solid or plate-like member formed essentially from a metal material, such as Cu, Fe, Al, etc., or from grinding or abrasion of a solid or plate-like member formed from ceramic or other inorganic material.

Chemical-mechanical polishing (CMP) has come to be employed as a new semiconductor processing technology.

This CMP technique enables (1): the realization of smooth device surface shapes; and (2): the realization of structures with embedded materials that differ from the substrate.

With regard to (1) above, fine patterns are formed precisely using lithography techniques. The combined use of techniques for affixing Si wafers enables materialization of three-dimensional IC's.

With (2), embedded structures are made possible. Since priorly, a technique of embedding tungsten (W) has been employed in multilayer wiring of IC's. With this technique, W is embedded by a CVD method in a trench of an interlayer film and the surface is made smooth by etching back. However, smoothing by CMP has come to be employed recently. Other examples of application of this embedding technique include damascene processes and element separation.

Such CMP techniques and applications are described in detail in "Science of CMP," published by Science Forum Co., Ltd.

A mechanism for a CMP process shall now be described briefly. As show in FIG. 18, a semiconductor wafer 252 is placed on an abrasive cloth 251 placed over a rotary table 250, and irregularities of the wafer 252 surface are eliminated by performing lapping, polishing, and chemical etching while pouring on an abrasive (slurry) 253. Smoothing is achieved by chemical reactions induced by a solvent included in the abrasive 253 and by mechanical abrasive actions of the abrasive cloth and the abrasive grains in the abrasive. Foamed polyurethane or non-woven fabric, etc., is used for example as the abrasive cloth 251. The abrasive has abrasive grains of silica, alumina, etc., mixed in water containing a pH regulator and is generally referred to as slurry. Lapping is performed while pouring on this slurry 253 and applying pressure onto the abrasive cloth 251 while rotating the wafer 252. 254 indicates a dressing part, which maintains the abrading ability of the abrasive cloth 251 and constantly keeps the surface of the abrasive cloth 251 in a dressed condition. M1, M2, and M3 indicate motors and 255 to 257 indicate belts.

The above-described mechanism is arranged as a system as shown for example in FIG. 19. This system largely comprises a wafer cassette loading/unloading station 260, wafer transfer mechanism part 261, the abrasive mechanism part 262, which was described using FIG. 12, a wafer cleaning mechanism part 263, and a system controller for controlling these parts.

A cassette 264 having wafers stored therein is placed in the wafer cassette loading/unloading station 260, and a wafer is taken out of the cassette 264. In the wafer transfer mechanism part 261, the wafer is retained, for example, by a manipulator 265, and is placed on the rotary table 250 disposed in the abrasive mechanism part 262. The wafer is then smoothed by means of the CMP technique. After smoothing of the wafer has been completed, the wafer is transported by means of a manipulator 266 to the wafer cleaning mechanism part 263 wherein the slurry is cleaned off of the wafer. The washed wafer is then housed in the wafer cassette 266.

The amount of slurry used for one abrasion process is about 500 cc to 1 liter/wafer. Also, pure water is made to flow in the above-described abrasive mechanism part 262 and the wafer cleaning mechanism part 263. Since the resulting wastewater are merged in the final stage at a drain, about 5 to 10 liters/wafer of wastewater flows out during a single smoothing operation. In the case of producing, for example, a three-layer-metal wafer, about seven smoothing operations are required for smoothing the metal and interlayer dielectric films. Thus wastewater of an amount of seven times the 5 to 10 liters is discharged for production of a single wafer.

It can thus be understood that the use of a CMP machine involves discharge of a considerable amount of slurry diluted with pure water.

SUMMARY OF THE INVENTION

However, chemicals are used as coagulants in a coagulating sedimentation method. Specifying the amounts of chemicals that will react completely is very difficult. Also, floc, which is a reaction product of a chemical and objects of removal, is generated in the form of a tuft-like suspended solid. Production of such floc is achieved under strict pH conditions and require an agitator, a pH measurement instrument, a coagulant injection apparatus, and a control equipment for controlling these components. Also, stable sedimentation of floc requires a large-size precipitation tank. For example, for a wastewater treatment capacity of 3 cubic meters($m^3$)/hour, a precipitation tank with a diameter of 3 meters and a depth of about 4 meters (i.e., a precipitation tank with a capacity of about 15 tons) is required. As a result, the entire system will be large-scale system requiring a floor space of about 11 meters×11 meters.

On the other hand, with a method, such as that shown in FIG. 17, which employs a filter having a filtering capacity of 5 cubic meters ($m^3$)/hour and a centrifugal separator in combination, the recycling of water becomes possible due to the use of the filter F (which is called a UF module and comprises polysulfone fibers or a ceramic filter) in the filtration unit 203. However, the filtration unit 203 is equipped with four filters F and, in view of the life of the filters F, the high-priced filters F, costing about 500,000 yen each, had to be replaced at least once a year. Therefore, the known filtration system suffers high running costs, specifically, the cost of electricity consumed by the motor and expenditures required for replacing pump P and the filters F.

Furthermore, in comparison to a dicing process, an incomparable amount of wastewater is discharged during a CMP process. The slurry is distributed in the form of a colloid in a fluid and does not precipitate readily due to Brownian motion. Moreover, the abrasive grains mixed in the slurry are very minute and comprise grains with particle diameters of 10 to 200 nm. When the slurry comprising such fine abrasive grains is filtrated through a filter, the abrasive grains enter the pores of the filter and cause clogging immediately and frequently, thus making treatment of a large amount of wastewater impossible.

Furthermore, aluminum contained in polyaluminum chloride (PAC) which is currently used as a coagulant may cause nervous disorders such as Alzheimer's disease. Thus, replacements for the coagulant involving such a risk have been demanded.

Therefore, the embodiments of the present invention provide a coagulation treatment apparatus capable of removing fine objects of removal from a fluid containing the objects of removal and a coagulation treatment method using the same.

A coagulant of the present invention includes at least a substance formed of metal belonging to Group 8 of the periodic table and silica.

Furthermore, a coagulant production apparatus of the present invention includes a production device for introducing metal belonging to Group 8 of the periodic table or ions of the metal into a fluid containing silica and for producing a coagulant by reaction between the silica and the ions of the metal.

Furthermore, a coagulant production method of the present invention includes: adding metal belonging to Group 8 of the periodic table or ions of the metal into a fluid containing silica; and producing a substance from the silica and the metal.

A coagulation treatment apparatus for a fluid according to the present invention includes a production device for introducing metal belonging to Group 8 of the periodic table or ions of the metal into a fluid containing objects of removal and for producing a substance in which the objects of removal and the ions are bonded to each other.

Furthermore, a coagulation treatment apparatus for a fluid according to the present invention includes: a production device for introducing metal belonging to Group 8 of the periodic table or ions of the metal into a fluid containing objects of removal and for producing a substance in which the objects of removal and the ions are bonded to each other; and an introduction device for coagulating the objects of removal by introducing the substance produced by the production device into the fluid.

A coagulation treatment method for a fluid according to the present invention includes: adding a substance containing metal belonging to Group 8 of the periodic table or ions of the metal, which will be bonded to objects of removal, into a fluid containing the objects of removal; and coagulating the objects of removal.

Furthermore, a coagulation treatment method for a fluid according to the present invention includes: adding a substance containing metal belonging to Group 8 of the periodic table or ions of the metal, which will be bonded to objects of removal, into a fluid containing the objects of removal; and coagulating the objects of removal.

Furthermore, a coagulation treatment method for a fluid according to the present invention includes: taking out a part of a fluid containing objects of removal; producing a coagulant by adding a substance containing ions of metal belonging to Group 8 of the periodic table, which will be bonded to the objects of removal, into the fluid taken out, and coagulating the objects of removal; and coagulating the objects of removal by mixing the coagulant into the fluid.

The present invention can provide the following effects.

Specifically, metal ions are introduced into a fluid containing fine objects of removal, thus producing a coagulated substance formed of the objects of removal and the metal ions. Thus, the objects of removal can be removed.

Moreover, a coagulant can be formed from a part of a fluid to be discharged and coagulation of remaining wastewater can be performed by use of this coagulant. Therefore, costs for coagulation treatment can be significantly reduced.

Furthermore, it is made possible to provide a coagulant formed of a compound in which metal and silica are bonded to each other. The coagulant containing silica and metal which are bonded to each other has coagulation effects equivalent to those of the above-described PAC or more. Furthermore, the coagulant of the present invention can be produced by use of simple and low-cost apparatus and method.

DESCRIPTION OF THE PREFERRED EMBODIMENTS

First Embodiment

Figure 1A:
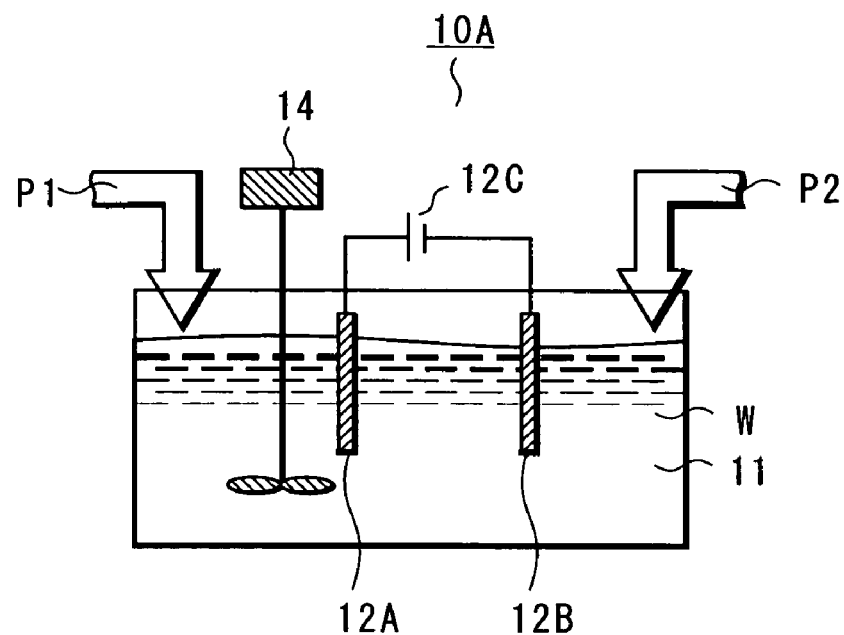
FIGS. 1A and 1B are schematic views for illustration of a coagulant production apparatus according to some preferred embodiments of the present invention.
Figure 1B:
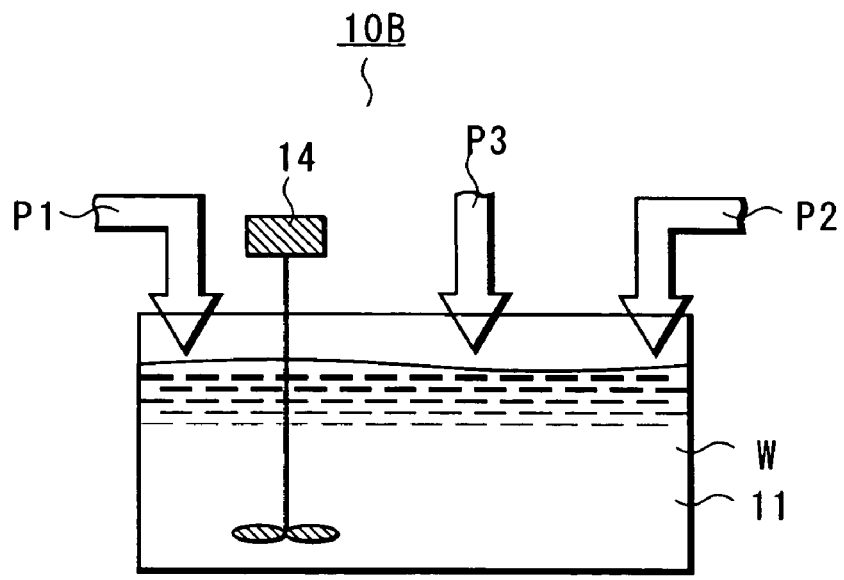

In this embodiment, a coagulation treatment apparatus for a fluid and a coagulation treatment method using the coagulation treatment apparatus will be described. First, with reference to FIGS. 1A and 1B, the coagulation treatment apparatus of this embodiment will be described. The coagulant production apparatus 10 which will be described with reference to FIGS. 1A and 1B is one example of the coagulation treatment apparatus. FIG. 1A is a schematic view of a coagulant production apparatus 10A for producing a coagulant. FIG. 1B is a schematic view of a coagulant production apparatus 10B of another embodiment.

With reference to FIG. 1A, the coagulant production apparatus 10A has a configuration including a production device for introducing metal belonging to Group 8 of the periodic table or ions of the metal into a fluid containing silica and for producing a coagulant in which silica and the metal ions are bonded to each other. Examples of metals belonging to Group 8 of the periodic table include iron, cobalt, and nickel. Here, as this production device, a pair of electrodes is employed. The coagulant production apparatus 10A of this embodiment will be described below together with its operations.

A tank 11 contains a fluid W subjected to treatment according to this embodiment. Here, as the fluid W, a fluid containing silica is employed. For example, wastewater resulting from a CMP process and the like contains silica. Moreover, a fluid other than the wastewater resulting from the CMP process can also be employed as long as the fluid contains silicon such as the fluid containing silica.

The pair of electrodes 12 including a first electrode 12A and a second electrode 12B has a function of treating the fluid by electrochemical treatment. Here, the electrochemical treatment device, for example, coagulation effects obtained by metal ions eluted from the electrodes. Here, one pair of the electrodes 12 is shown in FIG. 1A. However, a configuration including a number of pairs of the electrodes 12 immersed in the fluid can also be employed. Moreover, as the shape of the respective electrodes, various shapes such as a bar-like shape and a plate-like shape can be employed. It is preferable that the first and the second electrodes 12A and 12B are disposed close to each other within a range which does not cause short-circuiting. By narrowing the space between the electrodes, electric power used for the electrochemical treatment for the fluid can be reduced. Furthermore, as the first electrode 12A, metals of Group 8 of the periodic table or a conductor including metals of Group 8 can be employed. Alternatively, one covered with metals of the same group or with a conductor including metals of the same group can be employed. For example, iron (Fe) or one covered with iron can be employed as the first electrode 12A. The first and the second electrodes 12A and 12B are electrically connected to a power source 12C which supplies a direct current. Furthermore, the power source is equipped with a switching device for switching the pair of the electrodes 12. Moreover, a monitoring device for monitoring a current passing through the pair of the electrodes 12 or a voltage applied thereto may be additionally provided. According to output of the monitoring device, operations of the pair of the electrodes 12 can be controlled. Moreover, in order to suppress a rise in temperature of the fluid due to electrolysis of the pair of electrodes, a cooler may be provided. Specifically, the cooler can control the temperature of the fluid by use of a device for cooling the tank 11 or a device for allowing the fluid to flow into a cooling device.

A stirring device 14 has a function of stirring the fluid W contained in the tank 11. Here, the fluid W is stirred by a mechanism including a propeller which is connected to a motor and rotated in the fluid. As the stirring device, a device including another mechanism having a stirring function may be employed.

Reference numeral P1 indicates a path for supplying the fluid W that is water to be treated in this embodiment to the tank 11. Through this path P1, the wastewater discharged in the CMP process as described above may pass. Furthermore, CMP wastewater subjected to some kind of pretreatment, such as concentration, may be introduced into the tank 11 through P1.

Reference numeral P2 indicates a path through which a pH regulator or a conductivity regulator is introduced. These regulators may be introduced through separate paths. Here, the pH regulator is a regulator exhibiting acidity when dissolved in the fluid W in the tank 11. For example, other than chemicals such as hydrochloric acid and sulfuric acid, a solid or a powder, which exhibits acidity when dissolved in water, can be employed as the pH regulator. Microparticles included in the fluid can lose their fluidity when a pH of the fluid is shifted toward alkaline pH. Accordingly, the pH of the fluid may be shifted toward acidic pH by the pH regulator, thereby it is made possible to perform preparation of a coagulant with stable performance or to perform stable coagulation.

As the conductivity regulator, halogen ions or a compound containing halogen ions can be employed. Specifically, salt can be employed as the conductivity regulator and can be supplied into the fluid W in a state of being dissolved in a solvent such as water, in a state of a powder, or in a state of a solid. As described above, by adding the conductivity regulator into the fluid W, the conductivity of the fluid W can be improved. Therefore, it is possible to pass a predetermined current through the pair of the electrodes 12 via the fluid W.

Moreover, the monitoring device for monitoring the pH of the fluid may be provided to determine an amount of the pH regulator to be added, according to output of the monitoring device. Furthermore, a device for measuring the temperature of the fluid contained in the tank 11 may be provided to prevent an excessive rise in temperature of the fluid W.

Next, description will be given of operations of the pair of the electrodes 12 having the foregoing configuration. First, the fluid W is introduced into the tank 11 through P1. Thereafter, the pair of the electrodes 12 are operated by turning on the power source 12C. The first electrode 12A is an anode electrode connected to a positive pole of the power source 12C, and the second electrode 12B is a cathode electrode connected to a negative pole of the power source 12C. Accordingly, the fluid W is subjected to electrolytic treatment as an electrochemical technique. Since the first electrode 12A forming the anode is formed of the conductor as described above, iron (II) ions are eluted from the first electrode 12A into the fluid and are oxidized to iron (III) ions in the fluid. Thereafter, the iron ions chemically react with silica that is one of objects of removal in the fluid, thus producing a polymer compound of ferrous silica. The polymer compound that is a coagulated substance of ferrous silica is formed to be slightly larger than particles of original silica. Here, it is preferable that the amount of metal eluted from the pair of the electrodes 12 is, in a molar ratio, 4 to 5 times the amount of the objects of removal in the fluid. Specifically, it is preferable that more metal ions than those to be bonded to the objects of removal in the fluid are introduced.

Moreover, the polymer compound of ferrous silica functions itself as a coagulant. Furthermore, silica is the object of removal in the CMP wastewater. Therefore, coagulation of ferrous silica has merits that silica that is one of the objects of removal can be coagulated to facilitate wastewater treatment and a coagulant of ferrous silica can be produced. The production of the coagulant of ferrous silica makes it possible to coagulate abrasive grains and grinding waste besides silica, which are contained in the CMP wastewater, and to facilitate production of the coagulant or the wastewater treatment by coagulation.

The ferrous silica coagulant produced by bonding of the iron (III) ions and silica has a stronger coagulation action than that produced by bonding of the iron (II) ions and silica. However, the amount of the iron (III) ions eluted by electrolytic treatment for iron is minute, and most of the iron ions are eluted as the iron (II) ions and exist in the tank 11. Accordingly, an oxidizer may be added into the tank to oxidize the iron (II) ions. Thus, the iron (III) ions can be produced and the ferrous silica coagulant can be also produced. As oxidizers, hydrogen peroxide, ozone or the like is preferable. Furthermore, according to the experiment carried out by the inventors of the present application, it was possible to produce sufficient iron (III) ions by adding 3 mL of hydrogen peroxide of 30% concentration into 200 CC of CMP wastewater containing 1200 mg/L of silica. As a method for adding ozone, there are: a method for supplying, as bubbles, ozone generated by an ozone generator or the like into the fluid W in the tank 11; a method for allowing a fluid containing ozone to flow into the tank 11; and the like.

The timing of adding the oxidizer is preferably after the iron (II) ions are introduced or eluted. Specifically, the timing thereof is preferably during or after pH control to be described later. Moreover, hydrogen peroxide and ozone are contained in wastewater in a semiconductor manufacturing process. Thus, as the oxidizer, the wastewater containing hydrogen peroxide and ozone may be allowed to flow into the coagulant production apparatus in which the CMP wastewater is stored.

Consequently, it is made possible to efficiently treat the wastewater discharged in the semiconductor manufacturing process and to produce a coagulant at low cost. Moreover, hydrogen peroxide used in other manufacturing processes can also be diverted. The iron (III) ions are generated by oxidizing the iron (II) ions by use of hydrogen peroxide that is the oxidizer, or the like. Thus, by controlling the amount of the oxidizer which reacts with the iron (II) ions, the amount of the iron (III) ions to be generated can be controlled. Therefore, by turning at least a part of the iron (II) ions into the iron (III) ions by use of the oxidizer, the ratio between a coagulant produced from the iron (II) ions and a coagulant produced from the iron (III) ions can be controlled. Moreover, by controlling the amount of addition of the iron ions, the mol ratio between iron and silica, which are included in a coagulant to be produced, can also be changed. From the above, coagulation performance of the ferrous silica coagulant can be controlled, and a coagulant suitable for wastewater to be treated can be produced. Moreover, when a strong coagulant is added into organic wastewater or the like, foaming of the organic wastewater occurs, which leads to a problem of lowered coagulation action. However, regarding the coagulant according to embodiments of the present invention, the kind of the iron ions to be bonded to silica and the mol ratio between iron and silica can be controlled. Thus, the coagulation ability of the coagulant can be controlled. Therefore, the use of the coagulant according to the embodiments of the present invention can solve the problem.

Along with the foregoing electrochemical treatment, the both regulators are added through P2. The addition of the conductivity regulator into the fluid W makes it possible to surely perform electrical treatment by the pair of the electrodes 12. Moreover, the addition of the pH regulator makes it possible to prevent formation of floc caused by coagulation of the objects of removal mixed in the fluid W. Specifically, by controlling the fluid W to be more acidic than neutral, the particles contained in the fluid can be separated from each other. Furthermore, according to the experiment carried out by the inventors of the present application, it was possible to perform satisfactory production of the ferrous silica coagulant even when the pH is in the range of 2.5 to 2. Moreover, it is preferable that the optimum pH for generating the iron (III) ions by use of the oxidizer is around 2.8, that is acidic. Thus, the formation of the iron (III) ions and the production of the ferrous silica coagulant can be performed in approximately the same acidic environment. Therefore, when coagulation by the foregoing electrolytic treatment is performed for originally alkaline CMP wastewater, it is preferable that the pH regulator is added so that the CMP wastewater becomes at least neutral. However, the pH of the fluid W does not always have to be acidic. As long as there is no risk of formation of the flock, coagulation without the pH control can also be performed. Moreover, the pH control for the fluid may be performed after the foregoing coagulation treatment is performed.

Considering the case of discharging the treated water subjected to the foregoing coagulation treatment, it is preferable that the fluid subjected to the coagulation treatment is made neutral. This is in order to meet wastewater standards for pH. Moreover, in order to perform favorable coagulation treatment, it is preferable that the pH of the fluid is controlled to be neutral pH.

As the foregoing electrochemical treatment is conducted, a hydroxyl group (OH) is generated and the fluid in the tank becomes alkaline. Therefore, in order to inhibit alkalization of the fluid due to the phenomenon described above, action of the pH control device described above is important.

After a short period of time has passed since the foregoing treatment was started, the polarities of the pair of the electrodes 12 are switched. To be more specific, the first electrode 12A is set to be the cathode and the second electrode 12B is set to be the anode. This switching can also be performed periodically by previously setting a predetermined time. Furthermore, the switching can also be performed by monitoring the current passing through the pair of the electrodes 12 or the voltage applied to the pair of the electrodes 12. This switching of the electrodes can suppress conduction inhibition by the objects of removal attached to the cathode electrode. To be more specific, by switching one of the electrodes to the anode, metal on the surface of the electrode is eluted to strip off a layer of the objects of removal attached to the surface. Therefore, in order to continuously perform the coagulation treatment, it is preferable that the electrochemical treatment is performed while switching the polarities of the electrodes. Moreover, during the foregoing electrolytic treatment, the fluid W is stirred by the stirring device 14. Thus, the objects of removal contained in the fluid in the tank 11 can be evenly coagulated.

The coagulation of the objects of removal contained in the fluid W is performed by the foregoing electrical treatment. Specifically, the objects of removal contained in the fluid can be removed by this coagulation. Furthermore, if, as the objects of removal, a substance containing silicon such as silica is contained in the fluid, a polymer compound which functions as a coagulant can be produced. Furthermore, even if a non-coagulating substance, other than silica, is contained in the fluid W, the substance can be removed by the coagulation effects of the coagulant produced by use of the foregoing method. Moreover, the objects of removal contained in the CMP wastewater sometimes include harmful substances such as copper besides silica. Also in this case, the harmful substances such as copper can be coprecipitated and removed by producing the coagulant.

In the CMP wastewater, extremely minute silica with a particle size of about 100 nanometers is mixed. Therefore, a coagulant produced from such minute silica also becomes minute. The coagulant with a minute diameter generally has high coagulation performance. Furthermore, it is considered that lowering of coagulation capacity due to coagulation of the coagulant itself can also be suppressed. Here, a particle size distribution of the coagulant produced according to this embodiment is in the range of 1 □m to 500 μm. Moreover, this particle size distribution of the coagulant takes a shape having one peak or a plurality of peaks.

With reference to FIG. 1B, the coagulant production apparatus 10B of the other embodiment will be described. The coagulant production apparatus 10B shown in FIG. 1B has a configuration including a device for adding a substance containing metal into the fluid W, as an alternative for the pair of the electrodes 12 described above. To be more specific, a fluid containing metal is introduced into the tank 11 through a path P3. Specifically, as the metal contained in the fluid to be introduced, the same metal as that forming the pair of the electrodes 12 described above can be employed. For example, as this fluid, a fluid containing ionized metal (for example, iron) can be employed. As an example, a fluid containing ferric chloride can be introduced through the path P3. Moreover, by controlling the amount of iron (III) ions to be introduced, a coagulant most suitable for a use application can also be produced.

As described above, the coagulant production apparatuses described with reference to FIGS. 1A and 1B can perform the coagulation treatment for the fluid containing the objects of removal and can produce the polymer compound formed of silica and metal ions which are contained in the fluid. Therefore, when wastewater containing silica, such as the CMP wastewater, is employed as the foregoing fluid W, a high-performance coagulant can be produced while performing the wastewater treatment. Accordingly, the coagulant production apparatuses described above can be regarded as coagulation treatment apparatuses. Moreover, the coagulant produced by use of the method described above can be used in a wide range of fields, such as a water supply system and a sewage system.

Figure 2:
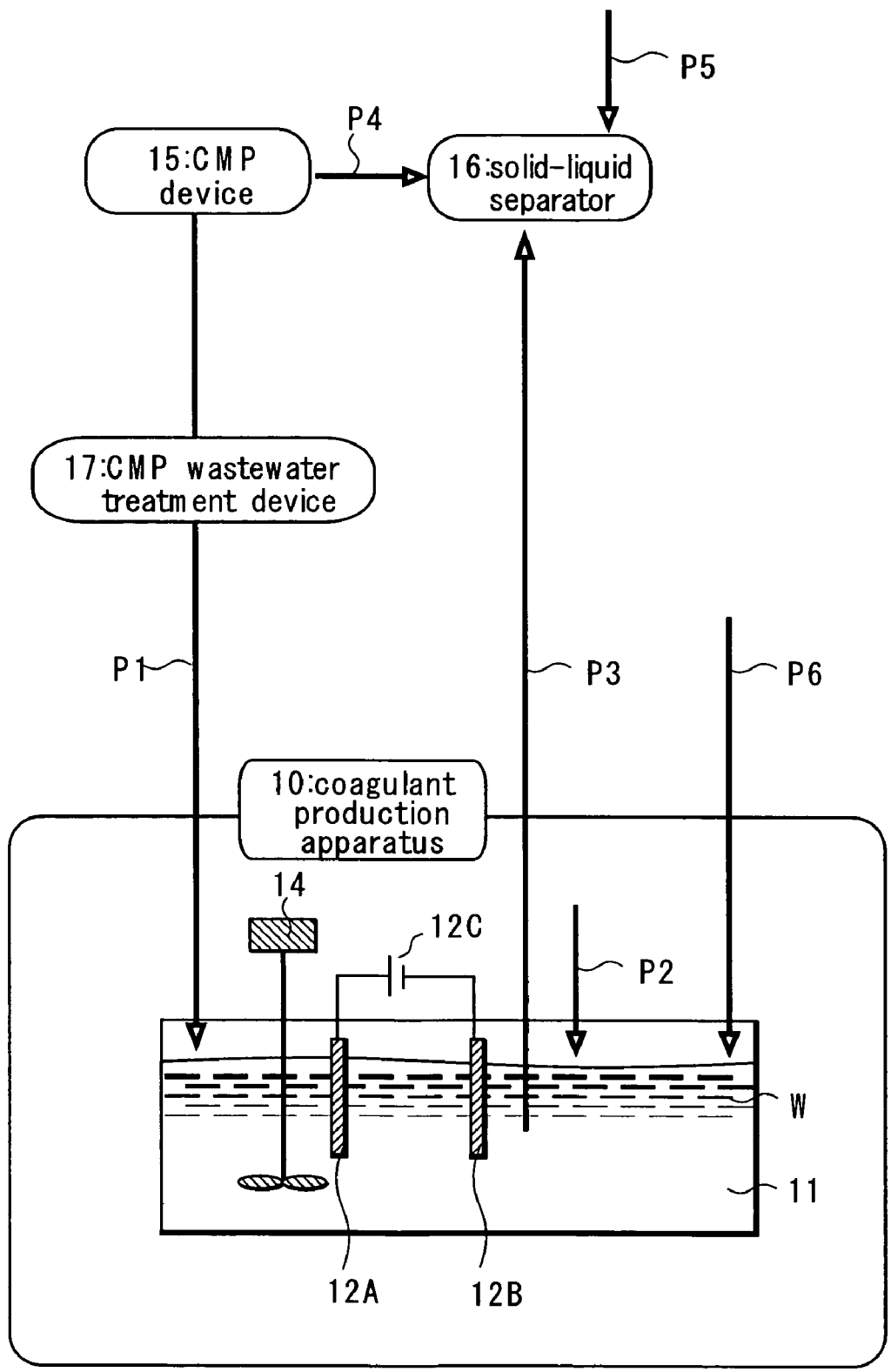
FIG. 2 is an explanatory view for illustration of a configuration of a specific wastewater treatment apparatus according to the preferred embodiments of the present invention.

With reference to FIG. 2, description will be given of an example of a wastewater treatment apparatus using the coagulant production apparatus 10 described above. With reference to FIG. 2, CMP wastewater containing silicon components such as silica is discharged from a CMP device 15. A path P1 indicates a path of the CMP wastewater. Through the path P1, the CMP wastewater discharged from the CMP device 15 is transported to the coagulant production apparatus 10. In the middle of the path P1, a CMP wastewater treatment device 17 is provided.

The CMP device 15 discharges the CMP wastewater by performing CMP treatment. A concentration of silica contained in this CMP wastewater is, for example, 1000 ppm to 2000 ppm. Moreover, the CMP wastewater contains objects of removal, such as metal, besides silica.

The CMP wastewater treatment device 17 performs pretreatment for the CMP wastewater to be sent to the coagulant production apparatus 10. Specifically, the CMP wastewater treatment device 17 performs concentration of the CMP wastewater, removal of foreign substances, and the like. As a specific method for concentrating the CMP wastewater, concentration by exposure to the sun, concentration by heating, concentration by use of a filtration device, concentration by coagulating sedimentation, and the like are conceivable. In this embodiment, a method using a filtration device to be described later in a second embodiment can also be employed. By performing the concentration of the CMP wastewater by use of the CMP wastewater treatment device 17, a coagulant of high concentration can be produced in the coagulant production apparatus 10. Here, the entire wastewater treatment apparatus can also be configured without the CMP wastewater treatment device 17.

In the coagulant production apparatus 10, a coagulant is produced from the CMP wastewater. Since the coagulant production apparatus 10 was described in detail with reference to FIGS. 1A and 1B, description thereof will be omitted here. By use of the coagulant produced by the coagulant production apparatus 10, the CMP wastewater of about 100 to 1000 times the amount of the coagulant can be treated.

A path P3 indicates a path through which the coagulant produced by the coagulant production apparatus 10 passes. The coagulant passing through this path may be in a state of a liquid as it is subjected to coagulation treatment by the coagulant production apparatus 10, or in a state of being subjected to treatment such as concentration. Moreover, the coagulant may be in a state of a solid or a powder.

A solid-liquid separator 16 performs purification of the wastewater by use of the coagulant produced by the coagulant production apparatus 10. As an example of the water treated by this solid-liquid separator 16, CMP wastewater passing through a path P4 is cited. The coagulant used here is one produced by subjecting a part of the CMP wastewater to electrolytic treatment. Therefore, in this embodiment, by use of the coagulant produced from a part of the CMP wastewater, solid-liquid separation for the remaining CMP wastewater itself can be performed. This is one of the merits of this embodiment. In other words, although the CMP wastewater has heretofore treated by use of a separately prepared treatment agent, it is made possible, in this embodiment, to treat the CMP wastewater without the treatment agent. Furthermore, the coagulant produced from the CMP wastewater can also be handled as a valuable resource.

As a concrete mechanism of the solid-liquid separator 16, a mechanism for performing film filtration, a mechanism for performing coagulating sedimentation, and the like can be generally employed. Moreover, here, the filtration device to be described later in the second embodiment can also be used. In any of the mechanisms described above, coagulation of the objects of removal contained in the fluid is performed by use of the coagulant of this embodiment. Thus, the objects of removal can be efficiently removed. Moreover, the use of the coagulant of this embodiment has a merit that coagulation of harmful substances, such as heavy metal, contained in the objects of removal is also made possible. Furthermore, a coagulated substance formed from the CMP wastewater is produced in the solid-liquid separator 16. This coagulated substance after being dehydrated can be used as an adsorbent or a heat insulator. Moreover, the water treated by the solid-liquid separator 16 may be discharged to the outside of the system or may be recycled.

A path P5 indicates a path through which wastewater other than the CMP wastewater flows into the solid-liquid separator 16. For example, wastewater discharged from equipment other than the CMP device in a semiconductor manufacturing plant can be introduced into the solid-liquid separator 16 through the path P5. Thus, the wastewater discharged from the semiconductor manufacturing plant can be treated by use of the coagulant produced from the CMP wastewater. Moreover, it is possible to allow wastewater other than the wastewater discharged from the semiconductor manufacturing plant to flow through the path P5.

A path P6 indicates a path through which an oxidizer flows into the tank 11. The path P6 has a function as an oxidizer addition device. Here, hydrogen peroxide or ozone is employed as the oxidizer, and a fluid containing the oxidizer is allowed to flow into the tank 11. Moreover, ozone gas may be diffused in the fluid W to dissolve ozone therein. Furthermore, wastewater containing hydrogen peroxide generated in a semiconductor manufacturing process, or ozone may be allowed to flow into the tank 11 through the path P6. Alternatively, hydrogen peroxide or ozone which are used in other manufacturing processes may be allowed to flow into the tank 11 through the path P6. Iron (III) ions can be produced by oxidizing iron (II) ions by use of the oxidizer. Thus, it is made possible to produce an oxidizer in which the iron (III) ions and silica are bonded to each other. Moreover, by controlling the amount of the oxidizer flowing through the path P6, the kind of the iron ions to be bonded to silica can be controlled. Consequently, coagulation capacity of the coagulant can be controlled.

In this embodiment described above, the description was given of the method for treating the wastewater by use of the coagulant produced from the CMP wastewater. However, as the wastewater treatment method, various methods other than that described above can be employed. For example, by treating the entire CMP wastewater discharged from the CMP device in the coagulant production apparatus 10, the entire CMP wastewater can be recycled as coagulants. In this case, the CMP wastewater may be concentrated by the CMP wastewater treatment device 17.

Next, with reference to FIGS. 3 to 7, description will be given of characteristics of the coagulant produced by the coagulant production apparatus described above.

Figure 3:
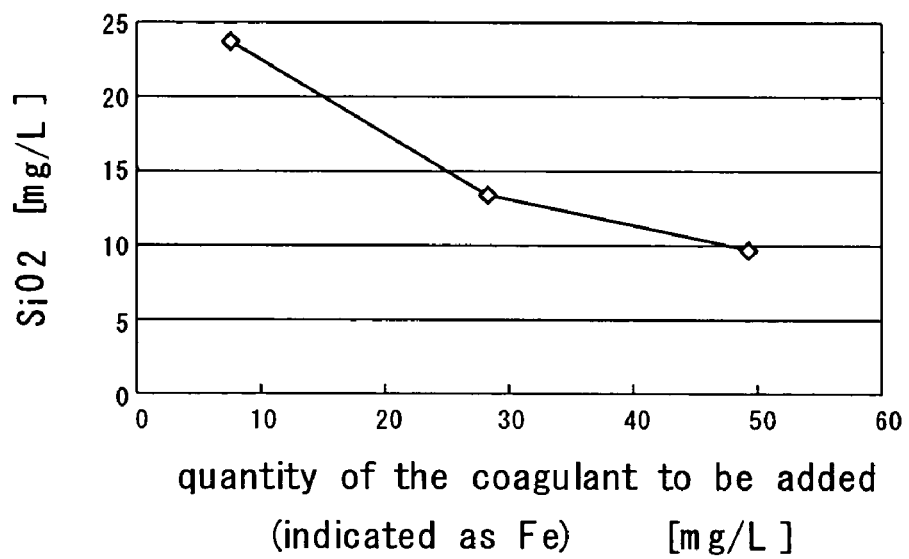
FIG. 3 is a graph showing characteristics of a coagulant according to the preferred embodiments of the present invention.

With reference to the graph of FIG. 3, coagulation effects of the coagulant produced by the coagulant production apparatus 10 of this embodiment will be confirmed. The vertical axis of the graph of FIG. 3 indicates a concentration of silica contained in a supernatant liquid of the CMP wastewater, and the horizontal axis indicates an amount of the coagulant to be added. Here, coagulating sedimentation treatment is performed in such a manner that several containers of the CMP wastewater are prepared, each containing 500 ml thereof, and the coagulant is added into the respective containers in amounts of 10, 30 and 50 ml/L, respectively. From the graph of FIG. 3, it can be seen that, the more the amount of the coagulant added is increased, the lower the concentration of silica in the wastewater becomes. Therefore, the coagulation effects of the coagulant produced according to this embodiment with respect to the CMP wastewater are confirmed.

Figure 4:
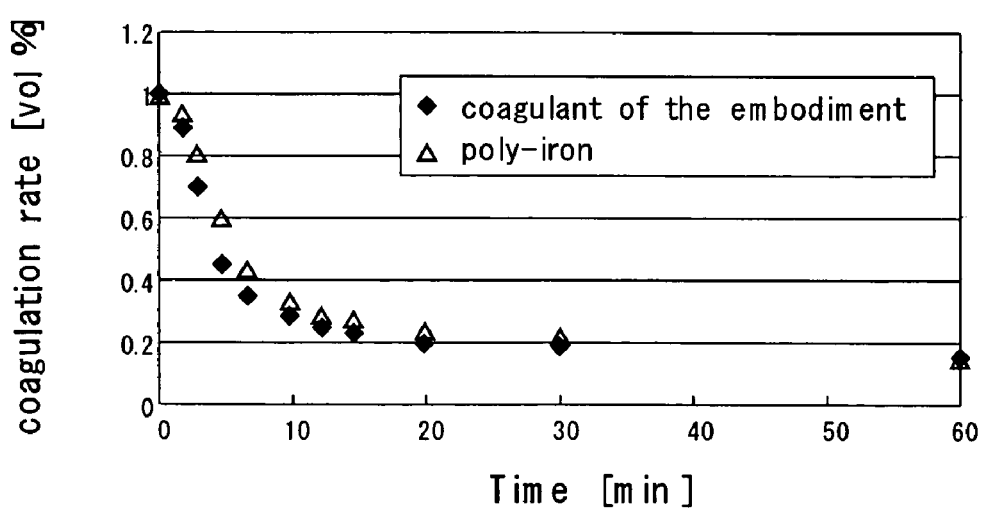
FIG. 4 is a graph showing characteristics of the coagulant according to the preferred embodiments of the present invention.

With reference to the graph of FIG. 4, coagulation performance of the coagulant of this embodiment is compared to that of a commercially produced coagulant. Here, coagulation performance of a commercially produced coagulant, which is formed of poly-iron, and that of the coagulant produced according to this embodiment are compared. The vertical axis of the graph of FIG. 4 indicates a coagulation rate of a coagulated substance measured by use of a measuring cylinder, and the horizontal axis indicates time that has passed since the coagulant was thrown in. With reference to FIG. 4, it is confirmed that the coagulant produced according to this embodiment has coagulation performance equivalent to that of the commercially produced coagulant or more.

Figure 5:
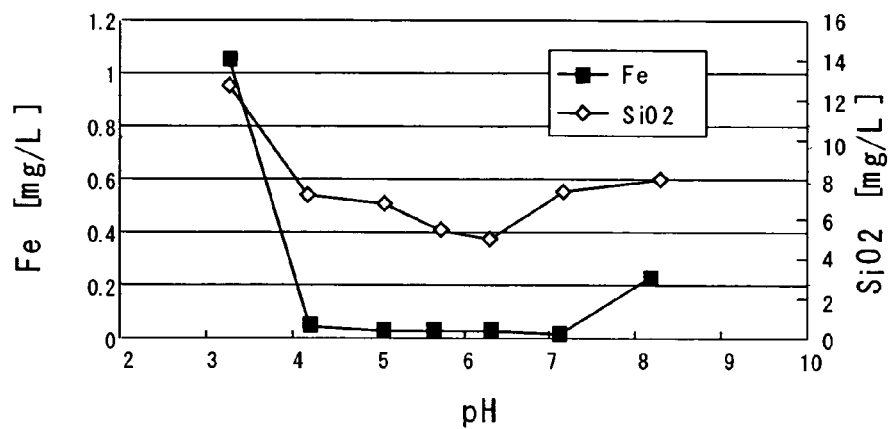
FIG. 5 is a graph showing characteristics of the coagulant according to the preferred embodiments of the present invention.

With reference to the graph of FIG. 5, examination regarding pH that is an important factor for coagulating sedimentation is performed. Here, coagulation treatment for several kinds of CMP wastewater having different pHs is performed by use of the coagulant described in this embodiment. Thereafter, amounts of silica and iron which remain in supernatant liquids are measured. In the graph of FIG. 5, the vertical axis on the left side indicates a concentration of iron remaining in the supernatant liquids, the vertical axis on the right side indicates the amount of silica remaining in the supernatant liquids, and the horizontal axis indicates the pH of the wastewater. With reference to this graph, it can be seen that the concentration of remaining iron is as extremely low as 0 mg/L when the pH is in the range of 4 to 7. Moreover, considering that the discharge standard of iron is 10 mg/L, it can be seen that the coagulant described in this application is applicable even to the wastewater having the pH of 4 or less or the wastewater having the pH of 7 or more. Moreover, the concentration of remaining silica shows an extremely low value when the pH is in the range of 4 to 8. Although relatively high concentrations of remaining silica are found in other pH ranges, there is no problem concerning discharge thereof. From the facts described above, it is confirmed that the coagulant described in this application can be used in wide pH ranges. It is confirmed that, preferably, the coagulant of this embodiment achieves high coagulation effects when the pH is in the range of 4 to 7.

Figure 6:
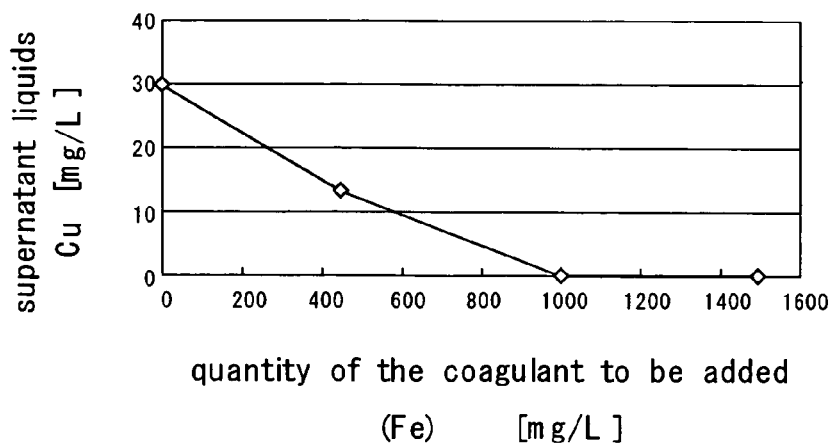
FIG. 6 is a graph showing characteristics of the coagulant according to the preferred embodiments of the present invention.

With reference to the graph of FIG. 6, coprecipitation effects of the coagulant of this embodiment will be confirmed. Here, a coprecipitation means a phenomenon in which the coagulant is precipitated after being coagulated with objects of removal contained in a fluid. Water to be treated here is wastewater containing copper. The vertical axis of the graph indicates a concentration of copper contained in a supernatant liquid, and the horizontal axis indicates an amount of the coagulant added. With reference to FIG. 6, it can be seen that, the more the amount of the coagulant added is increased, the lower the concentration of copper remaining in the supernatant liquid becomes. Moreover, it can be seen that almost no copper remains in the supernatant liquid when the amount of the coagulant added reaches 1000 mg/L or more. From the facts described above, the coagulant of this embodiment has a function of removing harmful metal such as copper from the fluid.

Figure 7A:
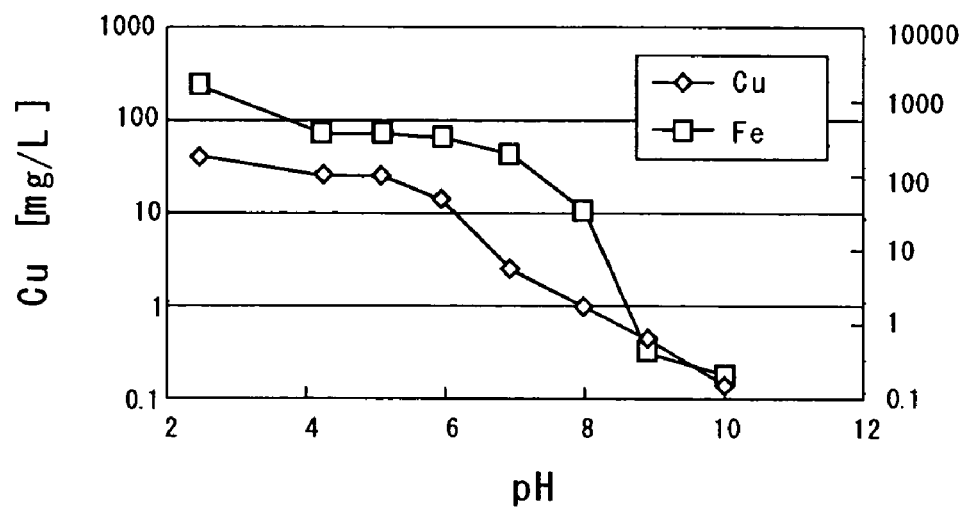
FIGS. 7A and 7B are graphs showing characteristics of the coagulant according to the preferred embodiments of the present invention.

With reference to the graph of FIG. 7A, in the case of treating wastewater containing copper, examination regarding concentrations of copper and iron, which remain in a supernatant liquid, and pH of the wastewater is performed. The vertical axis on the left side of the graph indicates an amount of remaining copper, the vertical axis on the right side indicates an amount of remaining iron, and the horizontal axis indicates the pH of the wastewater. Here, the amount of the coagulant to be added is fixed to 1000 mg/L. From this graph, it is confirmed that, the higher the pH of the wastewater is, the lower the concentrations of the remaining iron and copper become.

Figure 7B:
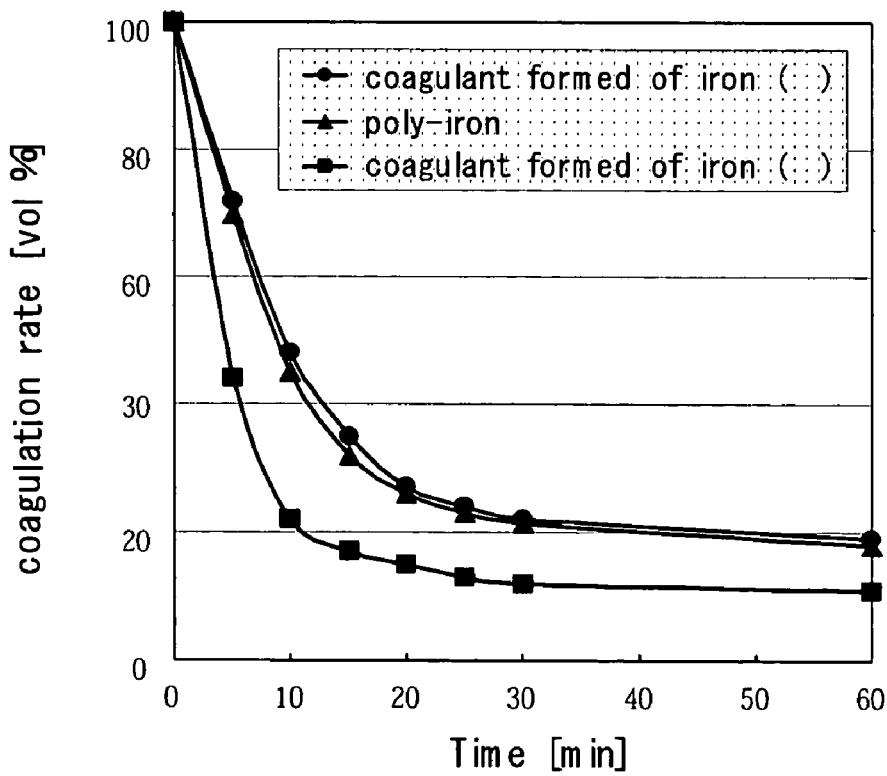

With reference to the graph of FIG. 7B, by use of the coagulant of this embodiment, changes with time in a sedimentation rate of wastewater containing slurry used for CMP are examined. Here, 500 mL of wastewater containing 1200 mg/L of silica is used. Moreover, as the coagulant, a coagulant formed primarily of iron (II) ions or iron (III) ions, which is produced according to this embodiment, and a commercially produced coagulant are used. As the coagulant formed primarily of iron (III) ions, used is one produced by adding 3 mL of hydrogen peroxide into a silica-containing solution in which iron (II) ions exist. First, with reference to FIG. 7B, coagulation capacity of the coagulant formed primarily of iron (II) ions and that of the commercially produced coagulant are compared. As a result, it is confirmed that changes with time in a sedimentation velocity and the sedimentation rate of silica by use of the coagulants described above show approximately the same values. Thus, it is confirmed that the coagulant formed primarily of iron (II) ions has approximately the same coagulation capacity as that of the commercially produced coagulant.

Next, the coagulation capacity of the coagulant formed primarily of iron (III) ions and that of the coagulant formed primarily of iron (II) ions are compared. With reference to FIG. 7B, it is confirmed that silica which cannot be precipitated by use of the coagulant formed primarily of iron (II) ions is precipitated by use of the coagulant formed primarily of iron (III) ions. Moreover, by comparing the sedimentation rates of the both coagulants within the same time period, it is confirmed that the coagulant formed primarily of iron (III) ions has a higher coagulating sedimentation rate.

Second Embodiment

In the first embodiment of the present invention, a filter device, which can be employed in the CMP filtration mechanism or a solid-liquid separator device 16 shown in FIG. 2, shall now be described. The definitions of the terms used for describing this preferred embodiment shall now be clarified.

A "colloidal solution" refers to a state wherein microparticles of diameters of 1 nm to 1 μm are dispersed in a medium. These microparticles undergo Brownian motion and have a property of passing through ordinary filter paper but not passing through a semipermeable film. These microparticles also have a property of being extremely slow in coagulation rate, which is considered to be due to the reduced opportunity of mutual approach of the microparticles resulting from the acting of electrostatic repulsive forces among the microparticles.

The term "sol" is used substantially synonymously to "colloidal solution," and unlike a gel, a sol is dispersed in liquid, exhibits fluidity, and the microparticles undergo active Brownian motion.

A "gel" refers to a state wherein colloidal particles have lost their abilities to move independently and have grouped together and solidified. For example, though agar or gelatin becomes dispersed and becomes a gel when dissolved in warm water, this sol loses fluidity and turns to a gel when cooled. Among gels are hydrogels, which have a high liquid content, and xerogels, which are somewhat dry.

Causes of gelation include drying by removal of the water that is the dispersant, adjustment of the pH of a silica slurry (pH 9 to 10) to pH 6 to 7 by addition of an electrolyte, reduction of fluidity by cooling, etc.

A "slurry" refers to a colloidal solution or sol, which is used for abrading and is prepared by mixing particles, a liquid, and chemicals. An abrasive used in CMP is called a "CMP slurry." Known examples of CMP slurries include silica abrasives, aluminum oxide (alumina) abrasives, cerium oxide (ceria) abrasives, etc. Among these, silica abrasives are used most often, and among such silica abrasives, colloidal silica is used widely. Colloidal silica is a dispersion in which silica ultramicroparticles with a colloid size of 7 to 300 nm are dispersed uniformly without settling in water or an organic solvent and is also referred to as "silica sol." With this colloidal silica, particles are monodispersed in water, and the mutual repulsive forces among the colloidal particles thus prevent the particles from settling even when left still for a year or more. Furthermore, a CMP slurry, which is employed in oxide films, contains ammonia.

This preferred embodiment provides a method of filtering, with which objects of removal are removed by filtration from wastewater of a state wherein the objects of removal are contained in a fluid in the form of a colloidal solution or sol.

The objects of removal take the form of a colloidal solution (sol) containing large amounts of microparticles with a particle distribution of 3 nm to 2 μm. Examples include abrasive grains of silica, alumina, or ceria, etc., that are used in CMP and semiconductor waste, metal waste, and/or insulating film material waste that are produced by abrasion by the abrasive grains. With the present embodiment, W2000 ILD1300 oxide filmstungsten abrading slurry, made by Cabot Rodel Nita Corp., was used as the CMP slurry. This slurry has a pH of 102.5 and has silica with a grain size distribution of 10 to 350200 nm as its principal component. The slurry is kinds of ammonia, and tends to disperse on account of strong alkali. Accordingly the slurry is hard to gel.

Figure 8:
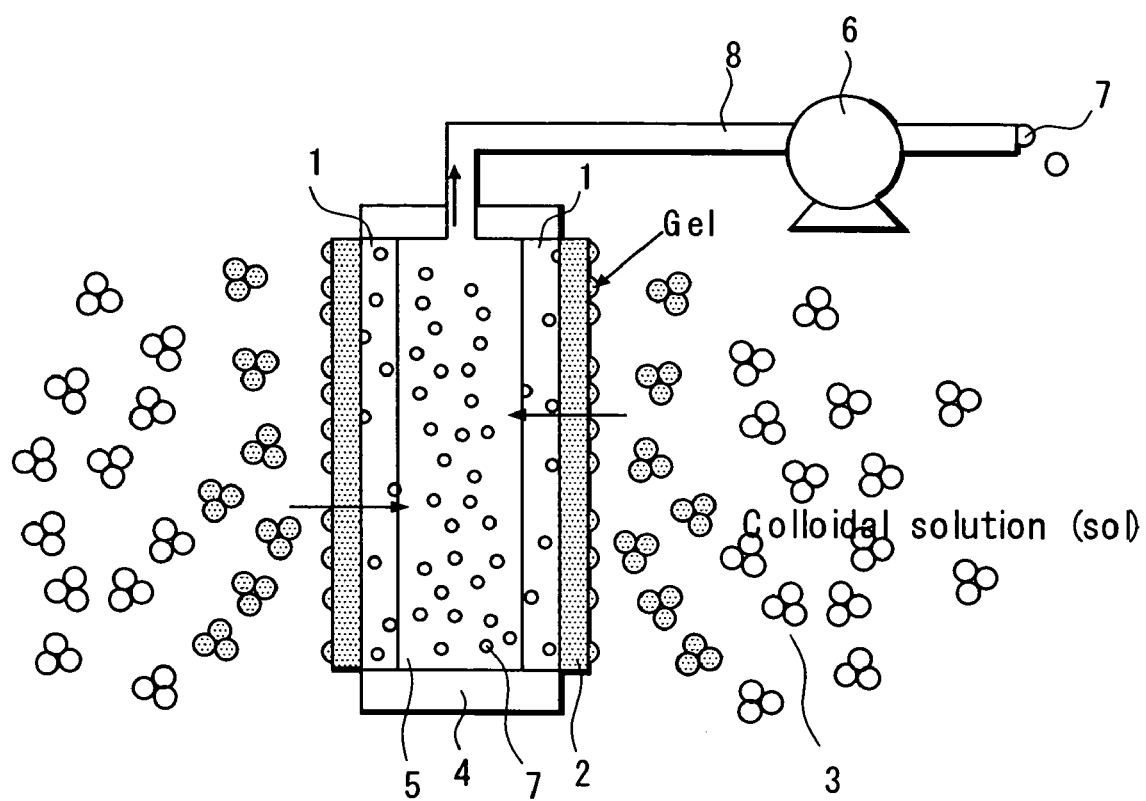
FIG. 8 is a diagram for illustration of a filter device included in the wastewater treatment apparatus according to the preferred embodiments of the present invention.

With reference to FIG. 8 and after FIG. 8, this preferred embodiment is a method of removal by a filter for objects of removal, mixed in the form of a colloidal solution (sol) in a fluid (wastewater), by means of a gel film formed from the objects of removal.

To be more specific, a gel film, which is to be formed as a second filter 2 from the CMP slurry that is the colloidal solution containing the objects of removal, is formed on the surface of an organic-polymer-based the first filter 1, and these filters 1 and 2 are immersed in a fluid 3 inside a tank in order to filter wastewater containing the objects of removal. The electrochemical treatment is carried out preliminary by using electrode 12 for the objects of removal that are contained in a fluid. Accordingly, the larger particles are formed in which the objects of removal are coagulated and it enables the fluid easier to become gelation.

In principle, as the first filter 1, either an organic-polymer-based filter or a ceramic-based filter can be used as long as the gel film can be attached. Here, a polyolefin-based polymer film with an average pore diameter of 0.25 μm and thickness of 0.1 mm was employed. A photographic image of the surface of this polyolefin-based filter film is shown in FIG. 9B.

The first filter 1 has the structure of a flat film disposed on both sides of a frame 4 and is immersed vertically into the fluid, and filtrate 7 is arranged to be taken out from a hollow part 5 of the frame 4 by suction by means of a pump 6.

The second filter 2 is a gel film, which is attached to the entire surface of the first filter 1 and is formed by suction and gelation of the sol of the objects of removal. Since a gel film has a jelly-like form, it is generally considered as not having the function of a filter. However, with the preferred embodiment, this gel film can be made to have the function of the second filter 2 by selection of the gel film forming conditions. These forming conditions shall be described in detail later.

The forming of the second filter 2, which is a gel film of the objects of removal, from the above-described colloidal solution (sol) of the objects of removal and the filtration by which the objects of removal are removed, shall now be described with reference to FIGS. 8 and 9A.

Fluid (wastewater), having the objects of removal of a colloidal solution (sol) mixed therein, becomes larger sol particles in which the objects of removal are coagulated by the electrochemical treatment. In other words, although these larger sol particles have not lost fluidity inherent with sol and are not yet gelated at this point, they are in a state of easily being gelated. Although large sol particles are shown as if two sol particles are combined in FIG. 1, the number of particles has no relation to the invention. It simply indicates that the repulsive forces of sol particles of approximately 20 nm in diameter are weakened by a coagulant or pH adjuster to form coagulated sol particles of approximately 100 nm.

1 indicates the first filter and 1A indicates filter pores. The film that is formed as layers at the openings of filter pores 1A and on the surface of the first filter 1 is the gel film of the objects of removal. The objects of removal are sucked in via the first filter 1 by the suction pressure from a pump, and due to the drying (dehydration) of fluid 3 by the sucking away of the water content, the particles of the objects of removal in the colloidal solution gels and binds, thereby forming on the surface of the first filter 1 a large gel film that cannot pass through filter pores 1A. This gel film forms the second filter 2.

When the film thickness of the second filter 2 reaches a certain thickness, gaps that do not allow passage of the gel of the objects of removal are formed in the second filter 2, and filtration of the objects of removal in the colloidal solution by use of this second filter 2 is thereby started. Thus as filtration is continued while performing suction by the pump 6, the gel film on the second filter 2 gradually becomes layered and thick, and eventually, the second filter 2 becomes clogged, thereby preventing further filtration. In this process, the colloidal solution of the objects of removal attaches onto the surface of the second filter 2 while gelling and the water of the colloidal solution passes through the first filter 1 and is taken out as filtrated water.

Figure 9A:
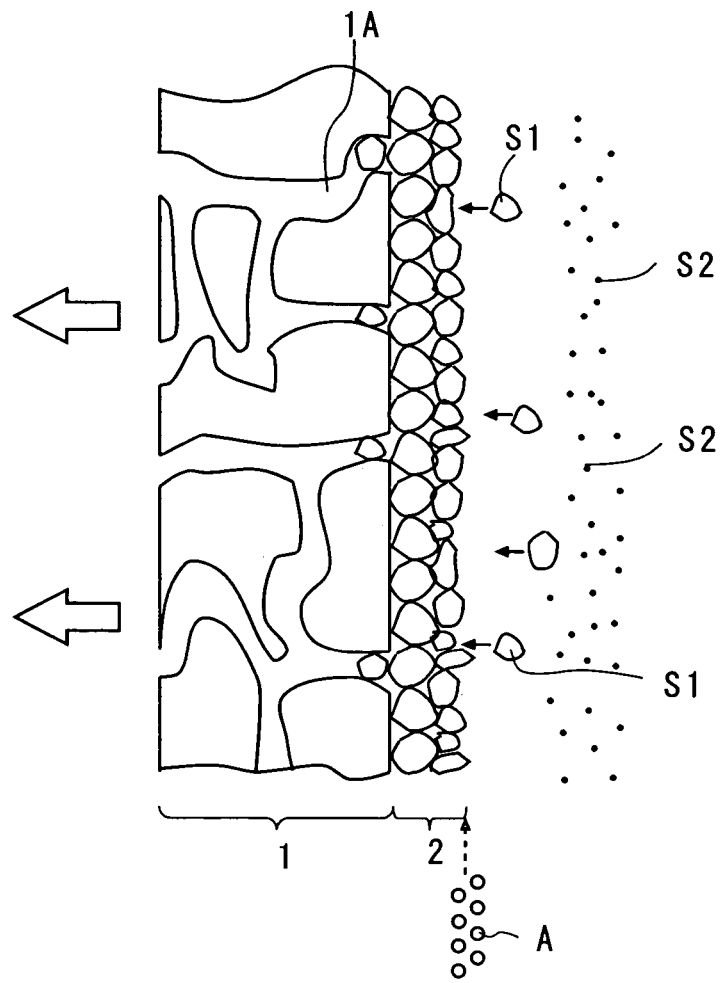
FIG. 9A is a diagram for illustration of operating principles of the filter device according to the preferred embodiments of the present invention.
Figure 9B:
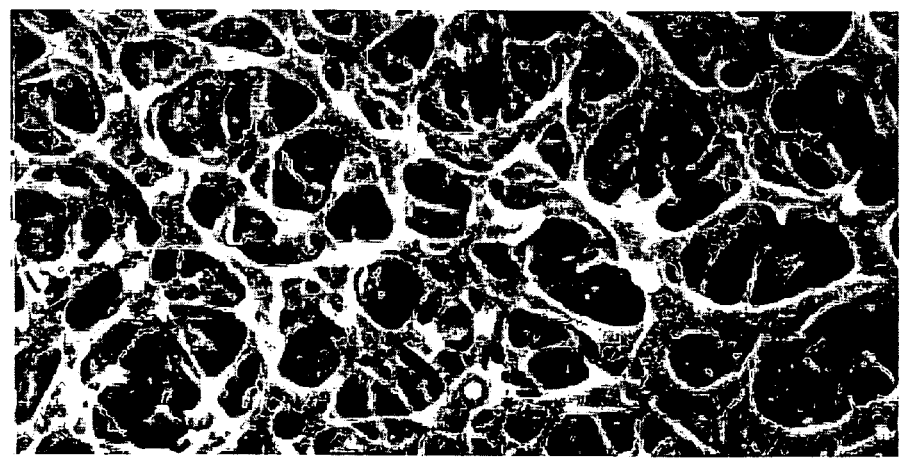
FIG. 9B is an enlarged view of a first filter.

In FIG. 9A, wastewater, in the form of a colloidal solution having the objects of removal mixed therein, exists at one side of the first filter 1, and filtrated water that has passed through the first filter 1 is produced at the opposite side of the first filter 1. The wastewater is sucked and made to flow in the direction of the arrow, and as the microparticles in the colloidal solution are made to approach the first filter 1 by the suction, the microparticles lose their electrostatic repulsive force and are made to gel, and a gel film, resulting from the binding of several microparticles, become adsorbed onto the surface of the first filter 1, thereby forming the second filter 2. By the action of this second filter 2, filtration of the wastewater is carried out as the objects of removal in the colloidal solution while being gelled. Filtrated water is sucked from the opposite side of the first filter 1.

By thus slowly sucking the colloidal solution wastewater via the second filter 2, the water in the wastewater is taken out as filtrated water and the objects of removal gel upon drying and become layered and captured as the gel film on the surface of the second filter 2.

The conditions for forming the second filter 2 shall now be described with reference to FIG. 10. FIGS. 10A and 10B show the forming conditions and the filtration amount of the second filter 2.

The conditions for filtering the second filter 2 shall now be described. The filtration rate of purified water in the filtration process differs greatly with the conditions for forming of the second filter 2, and, it becomes clear that unless the conditions for forming the second filter 2 are not selected appropriately, filtration by the second filter 2, which is a gel film, can hardly be performed. This is in agreement with the fact that it had priorly been said that the filtration of a colloidal solution is impossible.

Figure 10A:
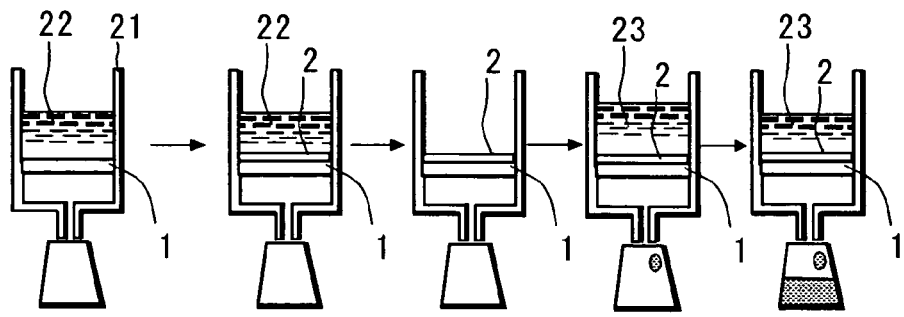
FIG. 10A is a series of cross-sectional views for illustration of film forming conditions of a second filter device according to the preferred embodiments of the present invention.
Figure 10B:
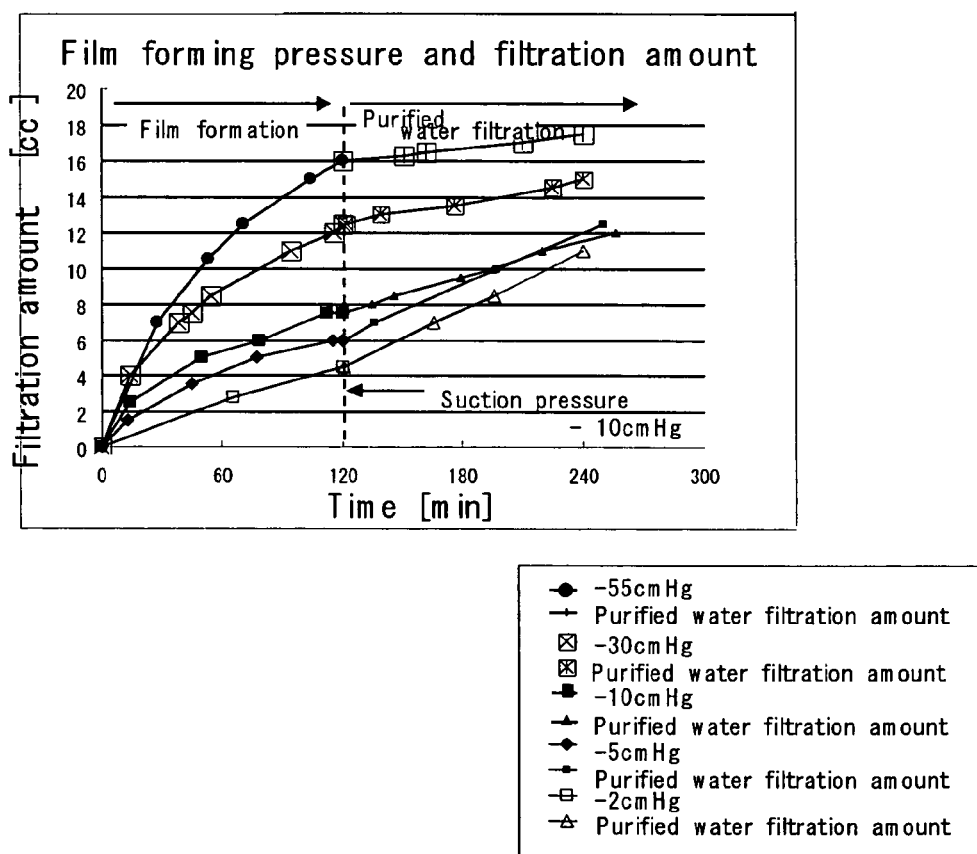
FIG. 10B is a characteristics diagram.

The characteristics shown in FIG. 10B were determined by experiments performed according to the method illustrated in FIG. 10A. That is, the first filter 1 is disposed at the bottom of a cylindrical container 21, 50 cc of the raw fluid of W2000 tungsten abrasion slurry 22, made by Cabot Corp., are placed inside the container, and the formation of a gel film is carried out at various suction pressures. The remaining slurry 22 is subsequently thrown out, 100 cc of purified water 23 is placed in the container, and filtration is performed at an extremely low suction pressure. The filtration characteristics of the gel film that is to be the second filter 2 can thus be examined. The first filter 1 used here had a diameter of 47 mm and an area of 1734 mm$^2$.

As shown in FIG. 10B, for the gel film forming process, the suction pressure was set at the various values of −55 cmHg, −30 cmHg, −10 cmHg, −5 cmHg, and −2 cmHg, and film forming was carried out for 120 minutes, after which the properties of the gel film were examined. As a result, it was found that the filtration amount was highest at 16 cc at 2 hours when the suction pressure was set to a strong pressure of −55 cmHg, and decreased in the order of 12.5 cc, 7.5 cc, 6 cc, and 4.5 cc.

Replacement by purified water is then carried out and filtration by the gel film is performed. At this point, the suction pressure is set to a fixed level of −10 cmmHg. With the gel film formed at a suction pressure −55 cmHg, a filtration rate of only 0.75 cc/hour could be achieved. The filtration rate of the gel film formed at a suction pressure of −30 cmHg was approximately 1 cc/hour. However, with a gel film formed at a suction pressure of −10 cmHg, the filtration rate was 2.25 cc/hour, with a gel film formed at a suction pressure of −5 cmHg, the filtration rate was 3.25 cc/hour, and with a gel film formed at a suction pressure of −2 cmHg, the filtration rate was 3.1 cc/hour, thus showing that with a gel film that is formed at an extremely weak suction pressure, stable filtration can be performed in the filtration process. These experimental results clearly show that by setting the suction pressure to a level at which the filtration rate will be approximately 3 cc/hour in the process of forming the gel film of the second filter 2, the filtration rate in the subsequent filtration process will be maximized.

The reason for the above results is considered to be because when the suction pressure is high, the gel film that is formed becomes low in the degree of swelling and thus dense and hard. The gel film is thus formed in a contracted state of low water content in which there are hardly any paths for the permeation of purified water.

On the other hand, when the suction pressure is made weak, the gel film that is formed becomes high in the degree of swelling and thus low in density and soft. The gel film is thus formed in a swollen state of high water content, thus enabling many paths for the permeation of purified water to be secured. This can be readily understood by an analogy to a gradual accumulation of powdery snow. An advantage of the preferred embodiment is that a gel film of a high degree of swelling, which has been formed at a weak suction pressure, is used to realize filtration that makes of use of the permeation of water through this gel film.

FIG. 9A shows one side of the filter of FIG. 8 and is actually a schematic view that illustrates how the gel film becomes attached.

The first filter 1 is immersed in a vertically upright manner in a colloidal solution wastewater, and the wastewater is a colloidal solution in which objects of removal are dispersed. By the electrochemical treatment of the electrodes 12, polymer compounds of iron-silica coagulants are formed. By the iron-silica polymer compounds act as coagulants, the objects of removal S2 are coagulated to form coagulated particles S1. When the wastewater is sucked through the first filter 1 at a weak suction pressure by means of the pump 6, the microparticles of the objects of removal gel as they approach the first filter 1 and become adsorbed onto the surface of the first filter 1. Of the gelled microparticles S1, indicated by white circles, those that are larger than the filter pores 1A of the first filter 1 gradually become adsorbed and layered on the surface of the first filter 1, thereby forming the second filter 2 comprising a gel film. Though gelled microparticles S1 that are smaller in diameter than filter pores 1A pass through the first filter 1, they do not present a problem since in the process of forming the second filter 2, the filtrated water is circulated back to the wastewater. The second filter 2 is thus formed over a period of approximately 120 minutes as mentioned above. In this film forming process, since suction at an extremely weak suction pressure is performed, the gelled microparticles S1 are layered while forming gaps of various shapes, thereby forming the second filter 2 as a soft gel film of extremely high degree of swelling. The water in the wastewater is sucked and made to permeate through this gel film of high degree of swelling and pass through the first filter 1 to be taken out as filtrated water, and the wastewater is thus filtrated in the final stage.

That is, with this preferred embodiment, the second filter 2 is formed as a gel film of a high degree of swelling, and by repeating the contraction of the gel film by dehydration of the water contained in the gel film in contact with the first filter 1 by suction at a weak suction pressure from the first filter 1 side and the swelling of this gel film by causing water to permeate and be replenished from the gel film in contact with the wastewater, just the water is made to permeate and be filtrated through the second filter 2.

Also, air bubbles A are sent up to the first filter 1 from the bottom of the wastewater to form a parallel flow of wastewater along the surface of the first filter 1. This is for making the second filter 2 become attached uniformly over the entire surface of the first filter 1 and to make the second filter 2 become attached softly while forming gaps. Though to be more specific, the air flow rate is set to 1.8 liters/minute. This flow rate is selected according to the film quality of the second filter.

In the subsequent filtration process, the gelled microparticles S1, indicated by white circles, are made to become adsorbed and gradually layered on the surface of the second filter 2 by the weak suction pressure. In this process, purified water permeates through the second filter 2 and the gelled microparticles S1, which are indicated by white circles and become layered further, and is taken out from the first filter 1 as filtrated water. That is in the case of CMP, abrasive grains of silica, alumina, or ceria, etc., and processing waste, such as semiconductor waste, metal waste, and/or insulating film material waste that are produced by abrasion by the abrasive grains, become layered and captured as gel on the surface of the second filter 2 and the water permeates through the gel film and can be taken out as filtrated water from the first filter 1.

However, as shown in FIG. 10B, when filtration is continued over a long period of time, the gel film becomes attached thickly onto the surface of the second filter 2, causing clogging and disabling the taking out of filtrated water. Thus in order to regenerate the filtration ability, the layered gel film must be removed.

A more specific filtration device shall now be described with reference to FIG. 11.

Figure 11:
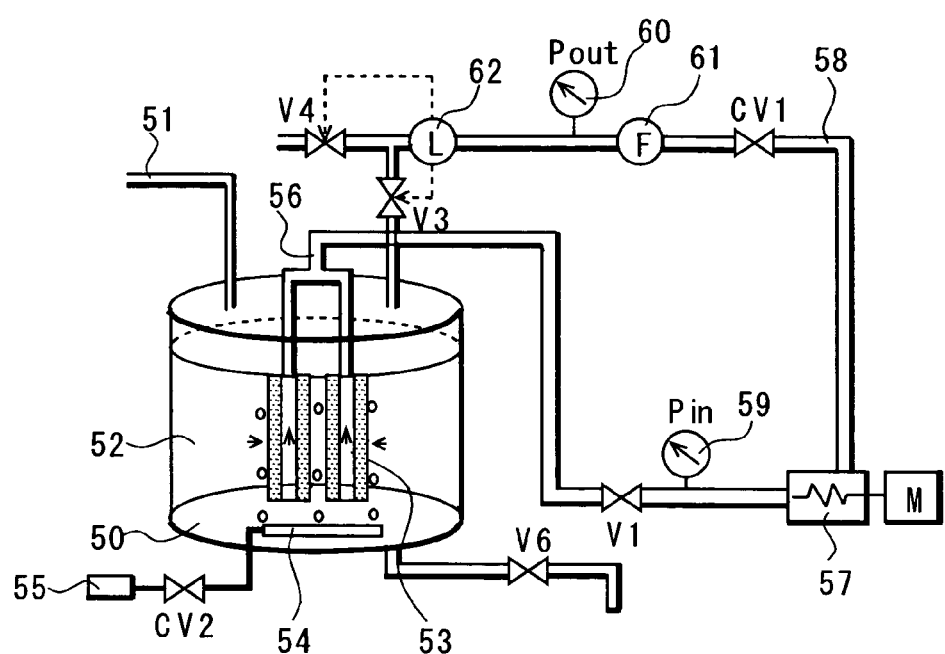
FIG. 11 is a schematic view for illustration of a specific filter device according to the preferred embodiments of the present invention.

In FIG. 11, 50 indicates a raw water tank. A pipe 51 is disposed above the tank 50 as a wastewater supply device, and fluid having objects of removal mixed therein flows through this pipe 51. For example in the semiconductor industry, wastewater (i.e., raw water), having objects of removal mixed therein and flows out from a dicing machine, back-grinding machine, mirror-polishing machine, or CMP machine, passes through the pipe 51. In the following description, the wastewater shall correspond to wastewater in which are mixed abrasive grains flowing out from a CMP machine and grinding or abrasive waste originating from abrasive grains.

A plurality of filtration units 53, each having a second filter formed therein, are disposed in raw water 52 stored in the raw water tank 50. An aeration pipe 54, such as that of a bubbling device used in an aquarium and made for example by opening small holes in a pipe, is disposed below the filtration units 53 and positioned so that air bubbles pass by the surface of the filtration unit 53. This aeration pipe 54 is disposed across the entire bottom side of the filtration unit 53 to enable air bubbles to be supplied uniformly across the entire surface of the filtration unit 53. 55 is an air pump. Here, the filtration unit 53 refers to the first filter 1, the frame 4, the hollow part 5, and the second filter 2 shown in FIG. 8.

A pipe 56, fixed to the filtration unit 53, corresponds to pipe 8 shown in FIG. 8. The fluid filtrated through the filtration unit 53 flows through this pipe 56, which is connected via a valve V1 to a magnetic pump 57, which performs suction. A pipe 58 is connected from the magnetic pump 57 and to valve V3 and valve 4 via control valve CV1. Also a first pressure gauge 59 is provided subsequent pipe 56 and measures the suction pressure Pin. Furthermore a flow meter F and a second pressure gauge 60 are disposed subsequent control valve CV1 of the pipe 58 and control is performed to maintain a fixed flow rate at flow meter 61. The flow rate of air from the air pump 55 is controlled by a control valve CV2.

The raw water 52, supplied from the pipe 51, is stored in the raw water tank 50 and is filtrated by the filtration unit 53. Air bubbles pass by the surface of the second filter 2 attached to the filtration unit, and a parallel flow, generated by the ascending force and rupturing of air bubbles, causes the gelled objects of removal that adsorb onto the second filter 2 to move and become adsorbed uniformly across the entire surface of the filtration unit 53, thereby maintaining the filtration capability and preventing it from deteriorating.

The above-described filtration unit 53, more specifically, the filtration unit 53 that is immersed inside the raw water tank 50 shall now be described with reference to FIGS. 12 and 13.

Figure 12A:
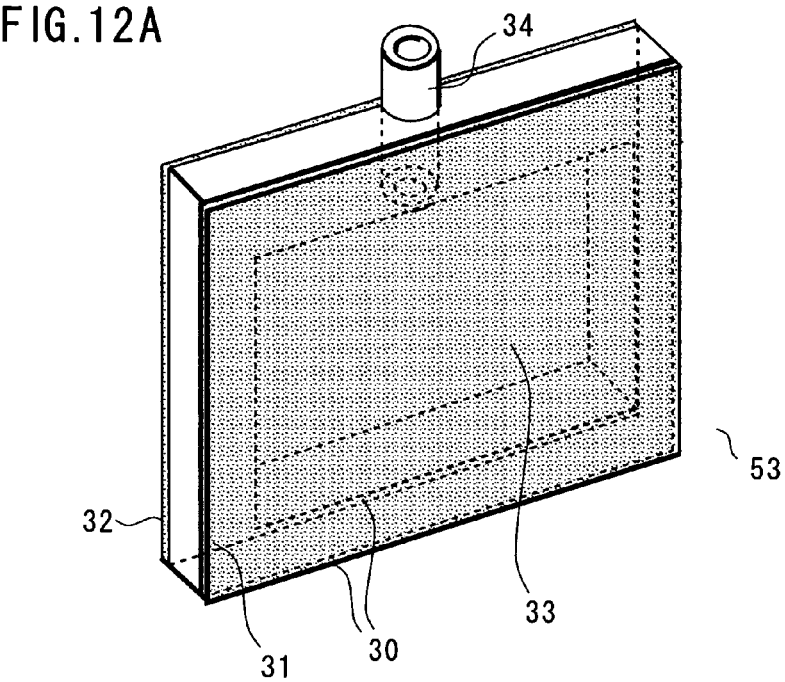
FIGS. 12A to 12C are perspective views for illustration of the filter device according to the preferred embodiments of the present invention.

Reference symbol 30 in FIG. 12A indicates a frame, having the shape of a picture frame, and this corresponds to the frame 4 of FIG. 8. Filter films 31 and 32, which are to become the first filter 1 (FIG. 8) are adhered and fixed onto both sides of the frame 30. Filtration by the filter films 31 and 32 is accomplished by applying suction, via a pipe 34 (corresponding to pipe 8 of FIG. 8), to an inner space 33 (corresponding to the hollow part 5 of FIG. 8), which is surrounded by the frame 30 and the filter films 31 and 32. Filtrated water is taken out via the pipe 34 that is mounted in a sealed manner to the frame 30. Needless to say, the filter films 31 and 32 and the frame 30 are sealed completely so as to prevent entry of wastewater into the abovementioned space 33 from parts besides the filter films.

Since the filter films 31 and 32 of FIG. 12A are thin resin films, they warp inwards when suction is applied and may rupture in some cases. Though this space must thus be made as small as possible, in order to make the filtration capability high, the space 33 must be formed to be as large as possible. This is resolved as shown in FIG. 12B. Though only nine spaces 33 are shown in FIG. 12B, many more are formed in actuality. Also, the actually employed the filter film 31 is a polyolefin-based polymer film with a thickness of approximately 0.1 mm and the thin filter film is formed to have a bag-like form as shown in FIG. 12B and is indicated as FT in FIG. 12B. The frame 30, with an integral pipe 34, is inserted inside this bag-like filter FT and the abovementioned frame 30 and the abovementioned filter FT are adhered together. Reference symbol RG indicates a presser device which presses the frame to which filter FT has been adhered from both sides. Filter FT is exposed from an opening OP of the presser device. Details shall be described again with reference to FIG. 13.

Figure 12C:
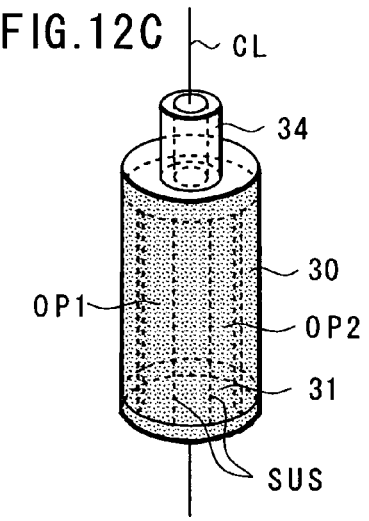
Figure 12B:
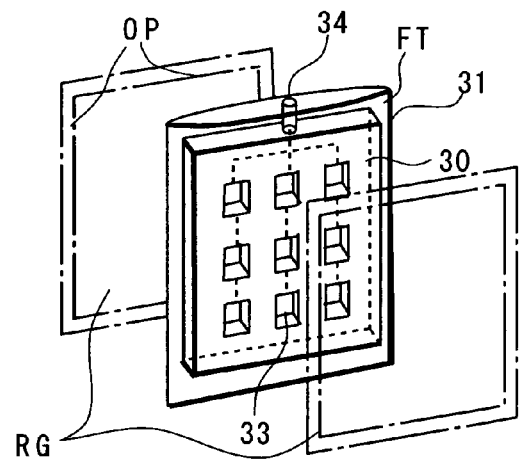

FIG. 12C shows an arrangement wherein the filtration unit 53 itself is formed to have a cylindrical shape. A frame, mounted to the pipe 34, is cylindrical in form and has openings OP1 and OP2 provided at its side face. Since side face parts corresponding to openings OP1 and OP2 are removed, a supporting device SUS, which supports the filter film 31, is provided between the openings. The filter film 31 is adhered to the side face.

The filtration unit 53 shall now be described further with reference to FIG. 13. First, a part 30a, corresponding to the frame 30 of FIG. 12B, shall be described with reference to FIGS. 13A and 13B. In appearance, the part 30a is formed to have a shape similar to corrugated cardboard. Thin resin sheets SHT1 and SHT2, each with a thickness of approximately 0.2 mm, are overlapped and a plurality of sections SC in the vertical direction are provided in between the sheets, thereby forming the spaces 33 surrounded by resin sheets SHT1 and SHT2 and sections SC. Each space 33 has a rectangular cross section with a length of 3 mm and width of 4 mm, and put in another way, the arrangement has a shape formed by aligning and integrating a number straws with such a rectangular cross section. The part 30a maintains the filter films FT at both sides at a fixed interval with respect to each other and shall thus be referred to hereinafter as a "spacer."

Numerous holes HL of 1 mm diameter are formed on the surfaces of the thin resin sheets SHT1 and SHT2 that make up spacer 30a, and filter films FT are adhered onto these surfaces. The filtrated water that is filtrated by filter films FT thus passes through holes HL and the space 33 and finally flows out via the pipe 34.

Filter films FT are adhered onto both surfaces SHT1 and SHT2 of the spacer 30a. The surfaces SHT1 and SHT2 of the spacer 30a have parts in which holes HL are not formed, and when parts of filter film FT1 are adhered directly onto such parts, since the parts of filter FT1 corresponding to parts where holes HL are not formed have no filtration capability and do not allow passage of wastewater, parts arise at which the objects of removal will not be captured. In order to prevent this phenomenon, at least two filter films FT are adhered together. The filter film FT1 at the outermost side is the filter film that captures the objects of removal, and as the surface SHT1 of the spacer 30a is approached from the side of filter film FT1, filter films with pores greater than the pores of filter film FT1 are provided, and in the present case, one such filter film FT2 is adhered. Since filter film FT2 is thus provided in between even at parts at which holes HL of the spacer 30a are not formed, the entire surface of filter film FT1 is made to exhibit a filtration function, the objects of removal are captured over the entire surface of filter film FT1, and the second filter film is formed over the entire surfaces of the front and rear surfaces FT1 and FT2. Also, though filter films FT1 and FT2 are shown as rectangular sheets due to reasons of illustration, they are actually formed to have bag-like shapes.

The manner in which the bag-like filters FT1 and FT2, the spacer 30a, and the presser device RG are mounted shall now be described with reference to FIGS. 13A, 13C, and 13D.

Figure 13A:
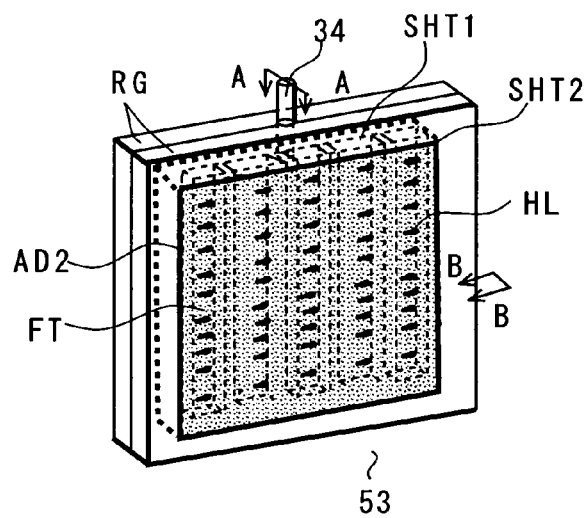
FIGS. 13A and 13B are perspective views for illustration of a more specific filter device according to the preferred embodiments of the present invention.
Figure 13D:
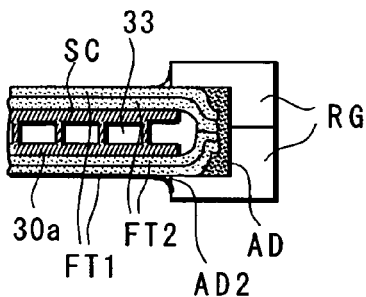
FIGS. 13C and 13D are cross-sectional views for illustration of a more specific filter device according to the preferred embodiments of the present invention.
Figures 13B, 13C:
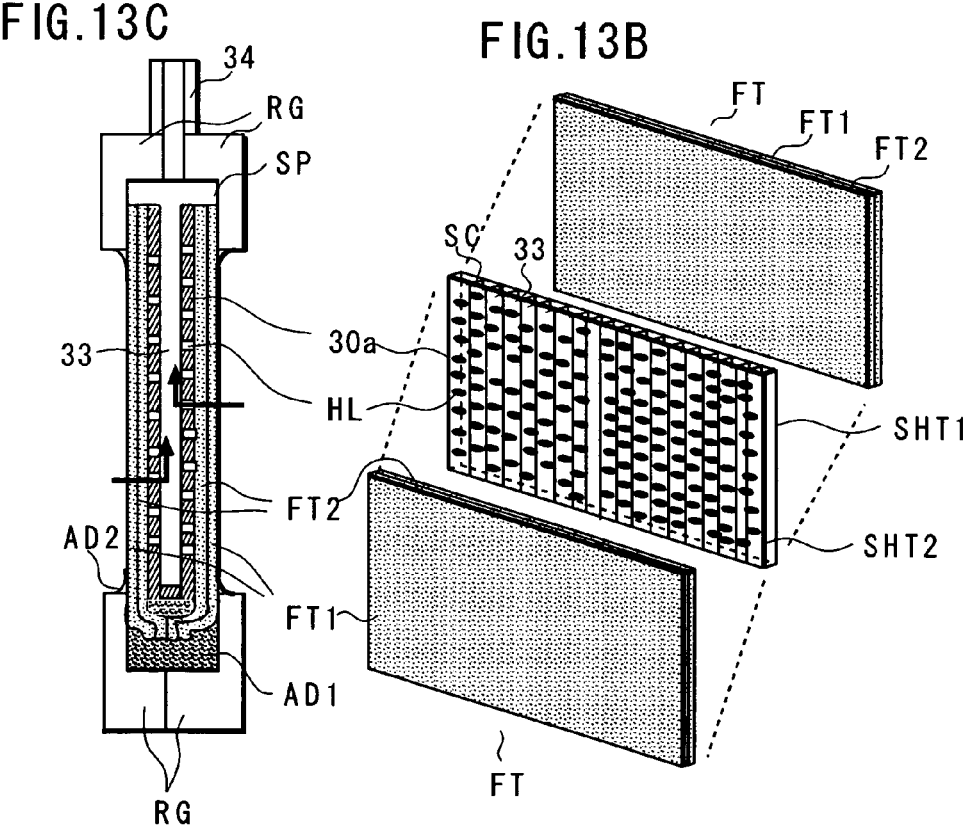

FIG. 13A is a completion diagram, FIG. 13C is a sectional view such obtained by sectioning along the direction of extension (vertical direction) of the pipe 34 from the head part of the pipe 34 as indicated by line A-A of FIG. 13A, and FIG. 13D is a sectional view obtained by sectioning filtration unit 35 in the horizontal direction as indicated by line B-B.

As can be understood from FIGS. 13A, 13C, and 13D, the spacer 30a, which is inserted inside bag-like filter film FT, has its four sides sandwiched, along with filter film FT, by the presser device RG. The three sides that are closed in bag-like manner and the remaining one side are fixed by adhesive agent AD1 applied to the presser device RG. Also, a space SP is formed between the remaining one side (the opening of the bag) and the presser device RG, and the filtrated water that is produced in the space 33 is sucked into the pipe 34 via this space SP. Also, an adhesive agent AD2 is applied along the entire periphery of openings OP of the presser device RG, thereby completely sealing these openings and providing a structure with which fluid cannot enter inside from parts besides the filter.

The space 33 and the pipe 34 are thus in communication, thus providing a structure wherein, when suction is applied from the pipe 34, fluid flows towards the space 33 through the pores of filter film FT and the holes HL of the spacer 30a and filtrated water is transported from the space 33 to the exterior via the pipe 34.

The structure shown in FIG. 13 is employed for the filtration unit 53 used here, and the frame (the presser device RG) to which the filter film is to be mounted has the size of A4 paper, and to be more specific, is approximately 19 cm in length, approximately 28.8 cm in width, and 5 to 10 mm in thickness. Since the filtration unit 53 is actually provided at both sides of the frame, the area will be double that obtained from the above dimensions (i.e., an area of 0.109 cm$^2$). However, the number and sizes of the filtration units can be selected freely according to the size of the raw water tank 50 and is determined by the required filtration rate.

An actual filtration method using the filtration unit shown in FIG. 11 shall now be described more specifically. First, wastewater, in which objects of removal are mixed in the form of a colloidal solution, is placed in the raw water tank 50 via the pipe 51. The filtration unit 53, which has just the first filter 1 and does not have the second filter 2 formed therein, is then immersed in this tank 50 and wastewater is circulated by sucking via the pipe 56 at a weak suction pressure by means of the pump 57. The circulation path passes through the filtration unit 53, the pipe 56, valve V1, the pump 57, the pipe 58, control valve CV1, the flow meter 61, an optical sensor 62, and a valve 63, and the wastewater is thus sucked in from the tank 50 and returned to the tank 50.

By this circulation, the second filter 2 is formed on the first filter 1 (31 in FIG. 9) of the filtration unit 53, and in the final stage, the intended objects of removal in the colloidal solution become captured.

That is, when the wastewater is sucked through the first filter 1 at a weak suction pressure by means of the pump 57, the microparticles of the objects of removal gel and become adsorbed onto the surface of the first filter 1. Of the gelled microparticles, those that are larger than the filter pores 1A of the first filter 1 become adsorbed and layered gradually on the surface of the first filter 1, thereby forming the second filter 2, comprising a gel film. Though the microparticles pass through the first filter 1, as the second filter 2 is formed, the water in the wastewater comes to be sucked upon permeation through the gel film and taken out as filtrated water through the first filter 1 and the wastewater is thus filtrated.

The concentration of microparticles contained in the filtrated water is monitored by the optical sensor 62, and filtration is started upon confirming that the amount of microparticles is lower than a desired mixing proportion. When filtration is to be started, valve V3 is closed in accordance with a detection signal from the optical sensor 62 and valve V4 is opened, thereby shutting off the abovementioned circulation path. Purified water is thus taken out from valve V4. Air bubbles, which are supplied constantly from the air pump 55, are supplied from aeration pipe 54 to the surface of the filtration unit 53 upon being regulated by control valve CV2.

As continuous filtration is continued, the water in the wastewater in the raw water tank 50 is taken out of the tank 50 as filtrated water, and the concentration of the objects to be removed in the wastewater thus increases. That is, the colloidal solution is concentrated and increased in viscosity. Wastewater is thus replenished into the raw water tank 50 from the pipe 51 to restrain the rise of concentration of wastewater and improve the efficiency of filtration. However, as a gel film attaches thickly onto the surface of the second filter 2 of the filtration unit 53, the second filter 2 becomes clogged and a state wherein filtration cannot be performed is entered eventually.

When clogging of the second filter 2 of the filtration unit 53 occurs, regeneration of the filtration capability of the second filter 2 is carried out. That is, the pump 57 is stopped and the negative suction pressure that is applied to the filtration unit 53 is eliminated.

Figure 14A:
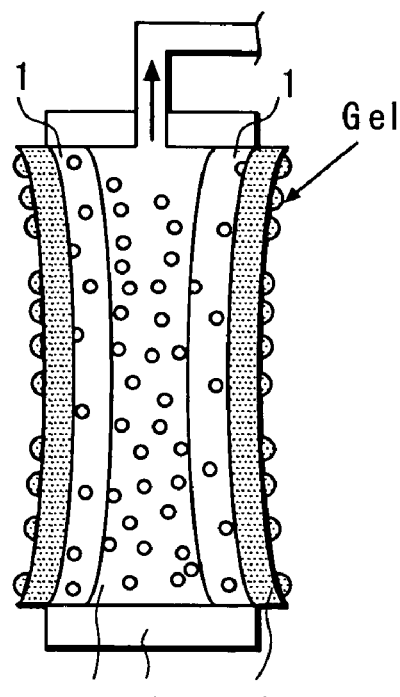
FIGS. 14A and 14B are cross-sectional views for illustration of regeneration of the filter device according to the preferred embodiments of the present invention.
Figure 14B:
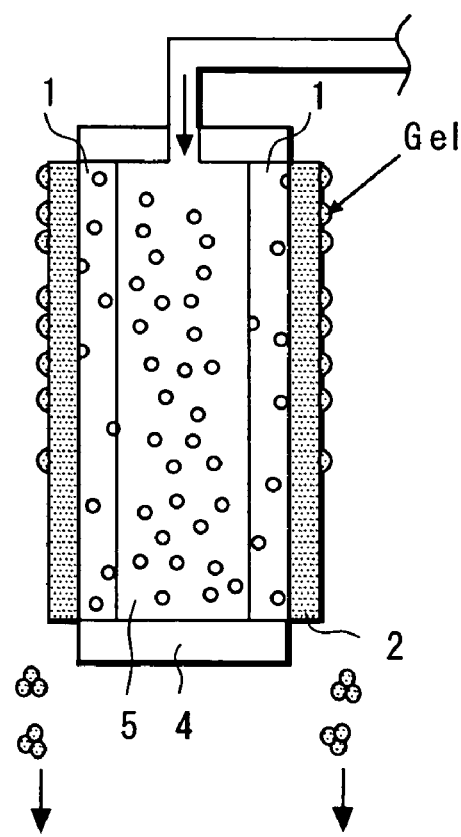

This regeneration process shall now be described in detail with reference to a schematic drawing shown in FIG. 14. FIG. 14A shows the condition of the filtration unit 53 during the filtration process. Since the hollow part 5 of the first filter 1 is set at a negative pressure in comparison to the outer side due to the weak suction pressure, the first filter 1 takes on a shape that is concave towards the inner side. The second filter 2, which is adsorbed on the surface of the first filter 1, thus takes on a similar, inwardly-concave shape. The same applies to the gel film that is gradually adsorbed onto the surface of the second filter 2.

In the regeneration process, since the weak suction pressure is stopped and the pressure returns substantially to atmospheric pressure, the first filter 1 of the filtration unit 53 returns to its original state. The second filter 2 and the gel film adsorbed to its surface likewise return to their original state. Consequently, since the suction pressure that had caused adsorption of the gel film is first of all eliminated, the gel film loses the force of adsorption onto the filtration unit 53 and, at the same time, receives an outwardly expanding force. The adsorbed gel film thus begins to separate from the filtration unit 53 due to its own weight. It is furthermore preferable to increase the amount of air bubbles from aeration pipe 54 by approximately two times in order to promote this separation. Experiments have shown that the separation begins from the lower end of the filtration unit 53 and then the gel film of the second filter 2 on the surface of the first filter 1 separates in an avalanche-like manner and settles to the bottom of the raw water tank 50. Thereafter, the second filter 2 can be formed again by circulating wastewater along the above-described circulation path. In this regeneration process, the second filter 2 returns to its original state and when it has been revived to the state enabling filtration of wastewater, the filtration of wastewater is carried out again.

Furthermore, when filtrated water is made to flow in reverse into the hollow part 5 in this regeneration process, firstly, the return of the first filter 1 to its original state is aided and the application of the hydrostatic pressure of the filtrated water applies an outwardly swelling force, and secondly, the filtrated water passes through the filter pores 1A from the inner side of the first filter 1 and seeps into the boundary between the first filter 1 and the second filter 2 to promote the separation of the gel film of the second filter 2 from the surface of the first filter 1.

As mentioned above, as filtration is continued while regenerating the second filter 2, the concentration of the objects of removal in the wastewater in the raw water tank 50 increases and the wastewater comes to have a considerable viscosity. Thus when the concentration of the objects of removal in the wastewater exceeds a predetermined concentration, the filtration operation is stopped and the system is left still for sedimentation. Concentrated slurry thus collects at the bottom of the tank 50 and this gel-like concentrated slurry is recovered by opening valve V6. The recovered concentrated slurry is compressed or dried by heating to remove the water contained therein and thereby further reduce its weight. The amount of slurry to be handled as industrial weight can thereby be reduced significantly.

The operation conditions of the filtration unit shown in FIG. 11 shall now be described with reference to FIG. 15. The operation conditions are those for the case where both surfaces (area: 0.109 m$^2$) of the above-described single filtration unit 53 of A4 size are used. The initial flow rate is set at 3 cc/hour (0.08 m$^3$/day), at which the filtration efficiency is good as was mentioned above, and the post-regeneration flow rate is set to this value as well. The air blow rate is set to 1.8 L/minute during film formation and filtration and to 3 L/minute during regeneration. "Pin" and "Regeneration Pin" are suction pressures and are measured by the pressure gauge 59. "Pout" and "Regeneration Pout" are pressures at the pipe 58 and are measured by the pressure gauge 60. The flow rate and regeneration flow rate are measured by the flow meter 61 and express the rate of filtration by suction from the filtration unit 53.

Figure 15:
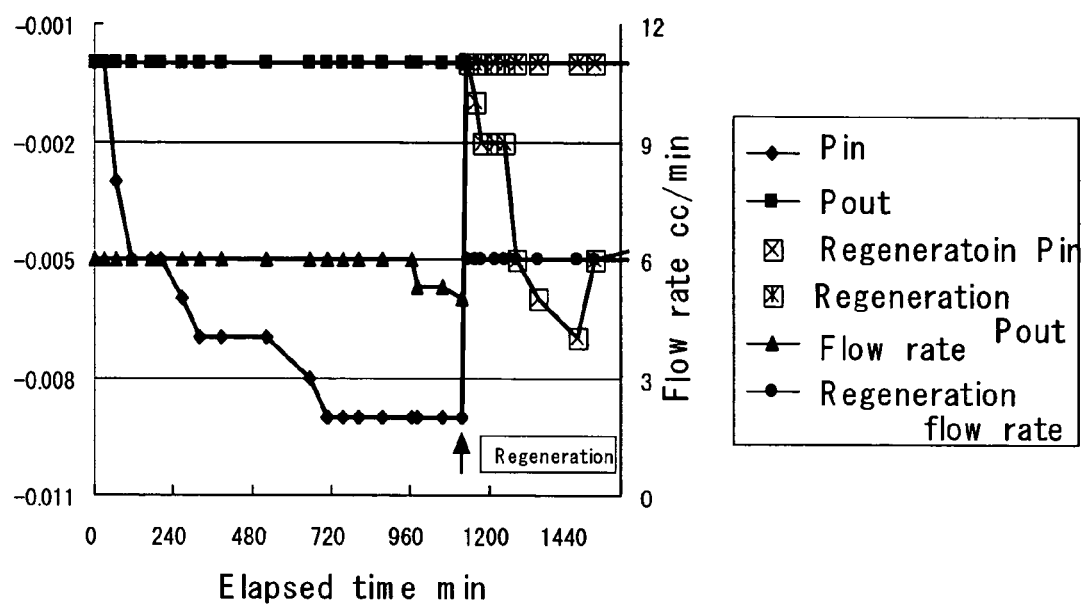
FIG. 15 is a characteristics diagram showing operating circumstances of the filter device according to the preferred embodiments of the present invention.

In FIG. 15, the Y-axis at the left side indicates pressure (unit: MPa) and the negative pressure becomes greater as the X-axis is approached. The Y-axis at the right side indicates the flow rate (unit: cc/minute). The X-axis indicates the time elapsed from film formation (unit: minutes).

An advantage of this preferred embodiment is that the flow rate and regeneration flow rate are controlled and maintained at 3 cc/hour in the second filter 2 formation process, the filtration process, and the post-regeneration filtration process. Thus in the film formation process, Pin is set to an extremely weak suction pressure of −0.001 MPa to −0.005 MPa to form the second filter 2 with a softly adsorbed gel film.

Then in the filtration process, Pin is increased gradually from −0.005 MPa and filtration is continued while securing a fixed flow rate. Filtration is continued for approximately 1000 minutes and the regeneration process carried out when the flow rate begins to decrease. This is because, the gel film attaches thickly onto the surface of the second filter 2 and causes clogging.

Then when the regeneration of the second filter 2 is performed, filtration is continued at a fixed regeneration flow rate while gradually increasing the regeneration Pin. Regeneration of the second filter 2 and refiltration are carried out until the raw water 52 reaches a predetermined concentration, or to be more specific, until the degree of concentration is increased by 5 times to 10 times.

As an operation method that differs from that described above, a method of performing filtration by fixing the suction pressure at −0.005 MPa, at which the filtration flow rate is high, can also be employed. Though the filtration flow rate decreases gradually in accompaniment with the clogging of the second filter 2 in this case, there is provided the advantage that the filtration time can be made long and the control of the pump 57 is simplified. The regeneration of the second filter 2 can thus be carried out when the filtration flow rate decrease to or below a fixed value.

Figure 16A:
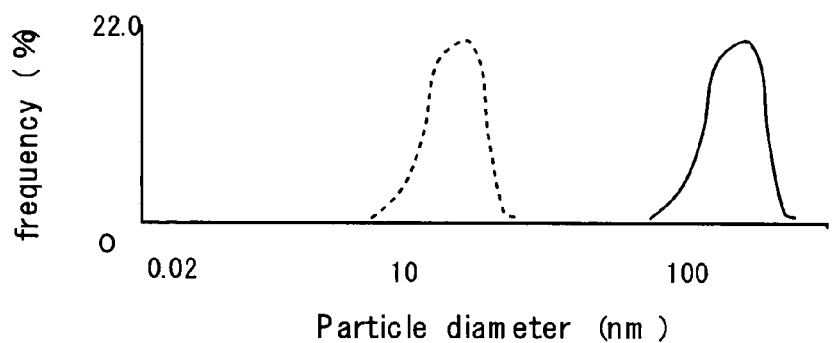
FIGS. 16A and 16B are characteristics diagrams showing filtration characteristics according to the preferred embodiments of the present invention.

FIG. 16A shows the particle size distribution of abrasive grains contained in a CMP slurry. A distribution curve indicated by the solid line shows the particle size distribution of abrasive grains contained in CMP slurry. A distribution curve indicated by dotted line shows the particle size distribution of abrasive grains used in dry CMP.

These abrasive grains are for CMP of an interlayer insulation film comprising Si oxide and the material comprises Si oxide and is generally called silica. The minimum particle size was approximately 0.076 μm and the maximum particle size was 0.34 μm. The larger particles are aggregate particles formed by aggregation of a plurality of the particles. The average particle size was approximately 0.14481 μm and the distribution peaks in the range of 0.13 μm to 0.15 μm near the average particle size. With reference to the distribution curve indicated by dotted line, the abrasive grains used in the dry CMP are shown with the distribution curve having the peak of 20 nm to 30 nm. This can tell that the abrasive grains are extremely microparticles comparison to the abrasive grains used in the CMP slurry. In the preferred embodiment, the fine abrasive grains are coagulated by electrochemical treatment and filtration by the gel film is performed to carry out the wastewater treatment.

To be more specific, CMP abrasive grains that are mainly used are silica-based, alumina-based, cerium-oxide-based, or diamond-based, and besides these, there are chromium-oxide-based, iron-oxide-based, manganese-oxide-based, BaCO4-based, antimony-oxide-based, zirconia-based, and yttria-based abrasive grains. Silica-based abrasive grains are used for the smoothing of semiconductor interlayer insulation films, P—Si, SOI, etc., and the smoothing of Al•glass disks. Alumina-based abrasive grains are used for the polishing of hard disks and smoothing of metals in general, Si oxide films, etc. Cerium oxide is used for the polishing of glass and the polishing of Si oxide, and chromium oxide is used for mirror polishing of steel. Manganese oxide and BaCO4 are used for the polishing of tungsten wiring.

Furthermore, there are sols called oxide sols, with which colloid-size microparticles, comprising a metal oxide, such as silica, aluminum, zirconia, or partly comprising a hydroxide, are dispersed uniformly in water or other liquid. Such oxide sols are used for the smoothing of interlayer insulation films and metals of semiconductor devices and are also being considered for use for aluminum disks and other information disks.

Figure 16B:
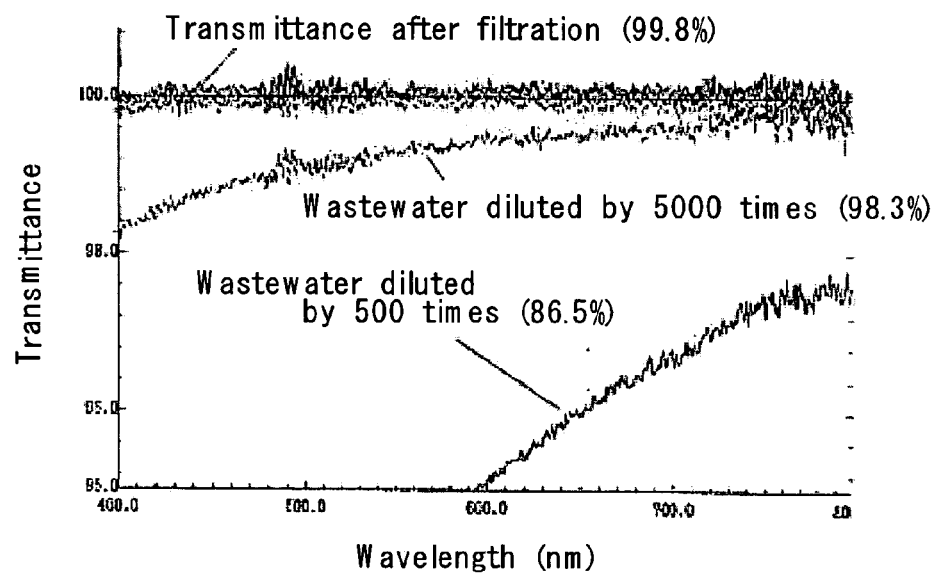
Figure 17:
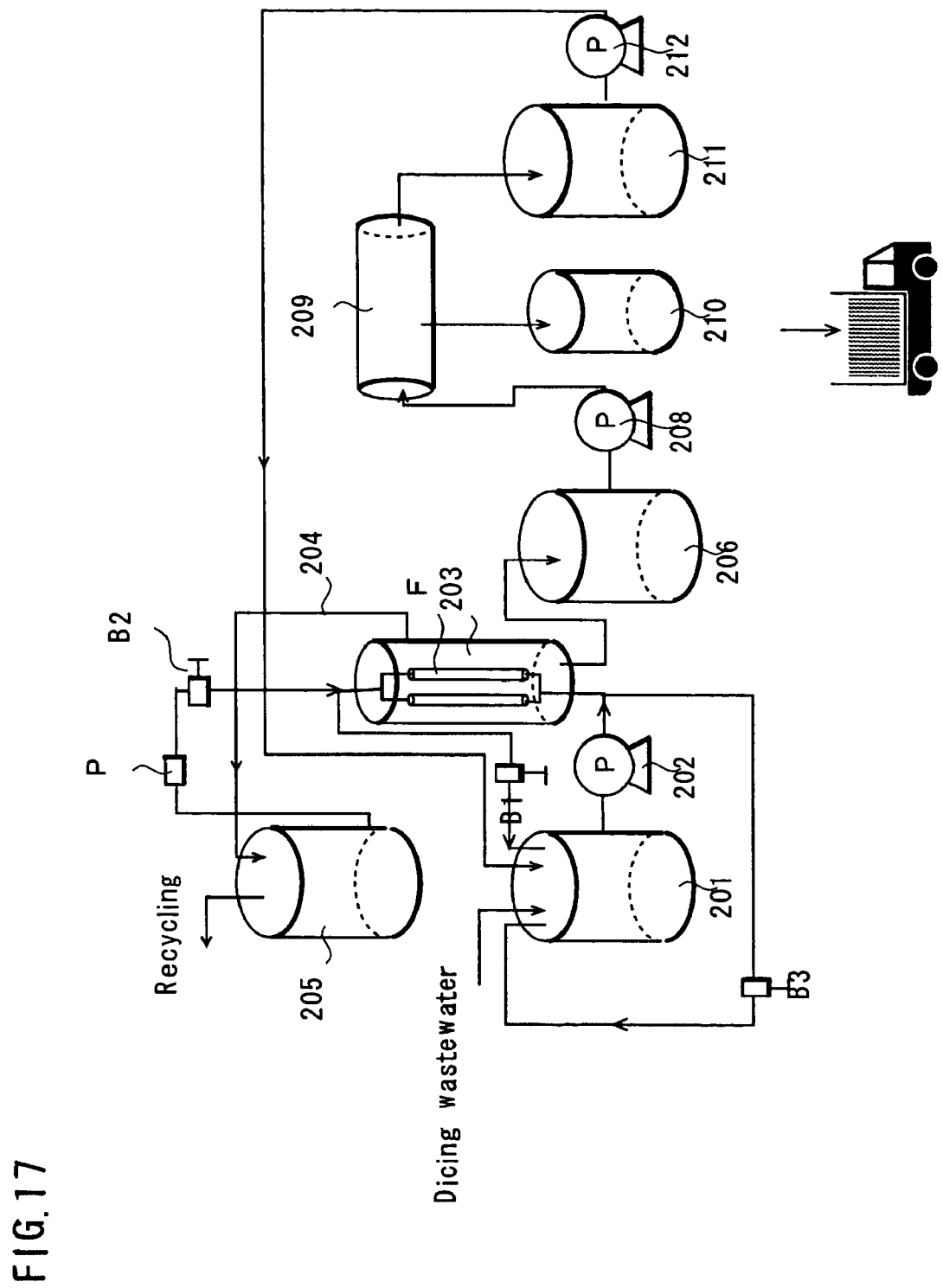
FIG. 17 is a schematic view for illustration of a conventional filtration system.
Figure 18:
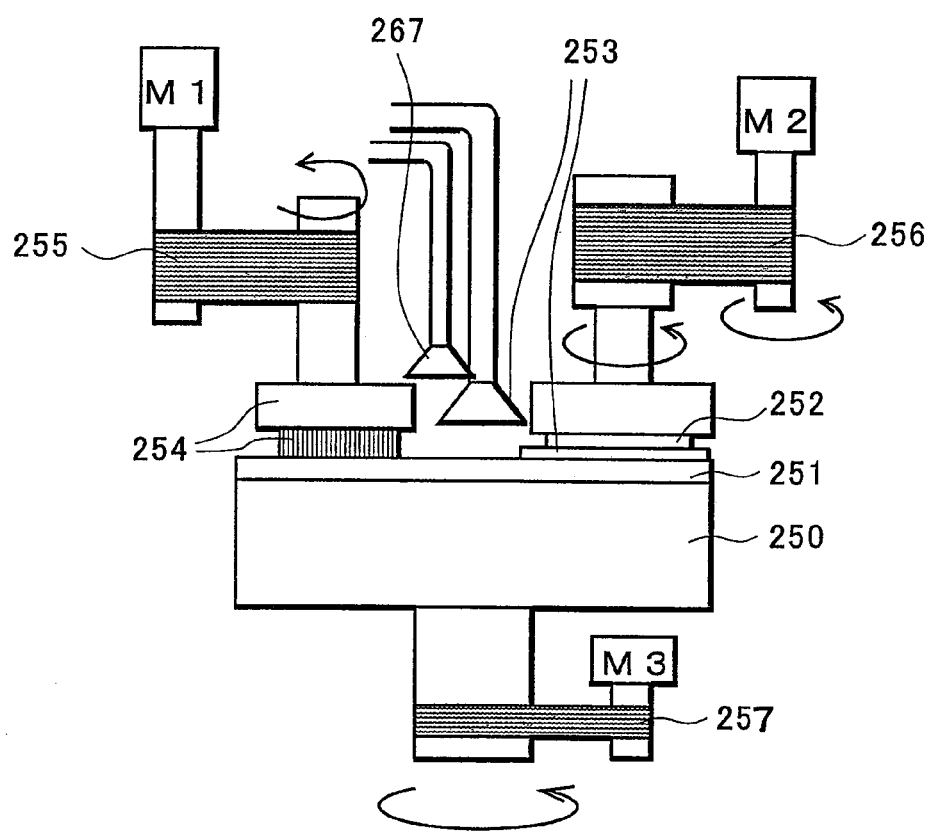
FIG. 18 is a schematic view for illustration of a CMP device.
Figure 19:
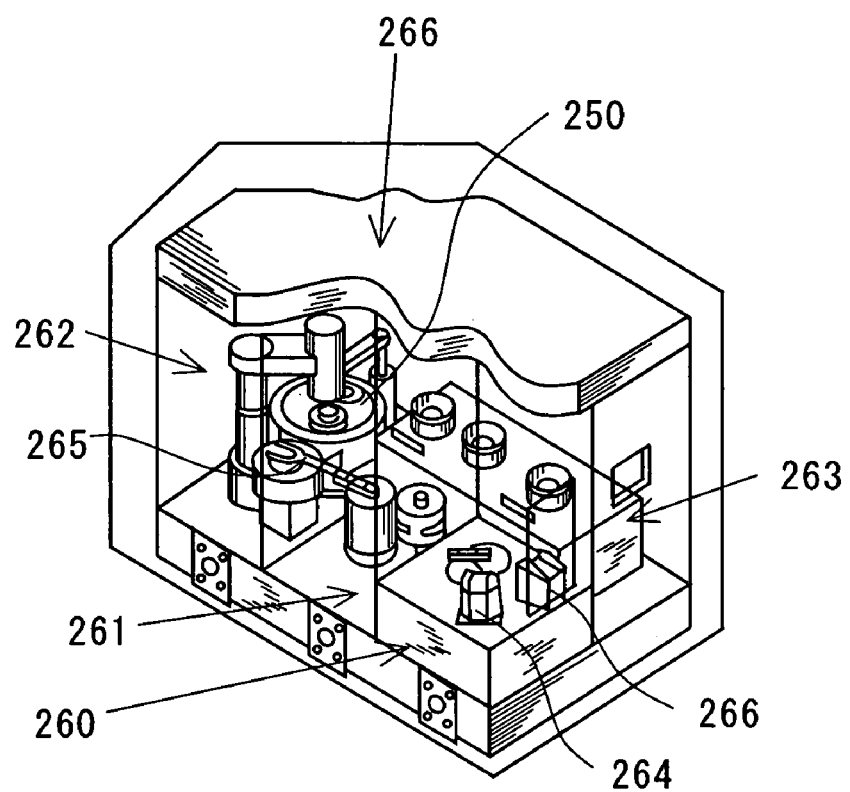
FIG. 19 is a schematic view for illustration of a CMP device system.

FIG. 16B shows data indicating that CMP wastewater is filtrated and abrasive grains are captured. With this experiment, the undiluted slurry described above was diluted by 50 times, 500 times, and 5000 times with pure water to prepare test solutions. These three types of test solution were prepared under the hypothesis that since a wafer is washed with pure water in a CMP process, the wastewater will be diluted by approximately 50 times to 5000 times.

Measurements of the optical transmittance of these three types of test solution for light of a wavelength of 400 nm showed that of the test solution of 50 times dilution to be 22.5%, that of the test solution of 500 times dilution to be 86.5%, and that of the test solution of 5000 times dilution to be 98.3%. In principle, if abrasive grains are not contained in the wastewater, light will not be scattered, and the optical transmittance will take on a value infinitesimally close to 100%.

When a filter, with the above-described second filter film 13 formed, was immersed in each of the three types of test solution and filtration was carried out, the transmittance after filtration became 99.8% for all three types. Since the optical transmittance after filtration is greater than the optical transmittance prior to filtration, abrasive grains have been captured. The transmittance data for the test solution of 50 times dilution does not appear in the drawing since its value was too small.

The above results show that when objects of removal of a colloidal solution discharged from a CMP machine are filtrated using the second filter 2 formed from a gel film of the filtration unit 53 provided in this preferred embodiment's filtration device, filtration could be performed to a transmittance of 99.8%.

What is claimed is:

1. A coagulation treatment apparatus for a fluid, comprising:
    a tank housing a first fluid including silica;
    a device introducing into the first fluid at least one metal belonging to Group 8 of the periodic table or ions of the metal that react with the silica to form a coagulate;
    a pretreatment device concentrating the amount of silica in the first fluid prior to the tank housing the first fluid;
    a path transporting the silica-concentrated first fluid from the pretreatment device to the tank;
    a path transporting the coagulate to a separator; and
    a path transporting a second fluid including silica to the separator for treating the second fluid including silica with the coagulate.

2. A coagulation treatment apparatus for a fluid, comprising:
    a tank housing a first fluid including silica;
    a device introducing into the first fluid at least one metal belonging to Group 8 of the periodic table or ions of the metal that react with at least a portion of the silica to form a coagulate;
    a second device re-circulating back into the first fluid the coagulate that reacts with the remainder of the silica to form additional coagulate;
    a pretreatment device concentrating the amount of silica in the first fluid prior to the tank housing the first fluid;
    a path transporting the silica-concentrated first fluid from the pretreatment device to the tank;
    a path transporting the coagulate and the additional coagulate to a separator; and
    a path transporting a second fluid including silica to the separator for treating the second fluid including silica with the coagulate and the additional coagulate.

3. The coagulation treatment apparatus for a fluid according to claim 1 or 2, wherein the device is a pair of electrodes which are immersed in the first fluid and contain the metal belonging to Group 8 of the periodic table, and the ions of the metal are introduced while being eluted from the electrodes.

4. The coagulation treatment apparatus for a fluid according to claim 3, wherein an amount of ions of the metal eluted from the electrodes is larger than an amount of ions that react with the silica.

5. The coagulation treatment apparatus for a fluid according to claim 3, further comprising:
    an addition device adding a substance exhibiting acidity into the first fluid,
    wherein the substance is produced while switching polarities of the electrodes.

6. The coagulation treatment apparatus for a fluid according to claim 1 or 2, wherein at least a part of the ions is trivalent ions.

7. The coagulation treatment apparatus for a fluid according to claim 1 or 2, further comprising:
    an oxidizer addition device for adding an oxidizer for oxidizing the ions.

8. The coagulation treatment apparatus for a fluid according to claim 7, wherein the oxidizer is any of hydrogen peroxide and ozone.

9. The coagulation treatment apparatus for a fluid according to claim 7, wherein an amount of the oxidizer to be added is controlled so as to mix the ions with the ions oxidized by the oxidizer.

10. The coagulation treatment apparatus for a fluid according to claim 1 or 2, further comprising:
    an addition device for adding a substance exhibiting acidity into the first fluid.

11. The coagulation treatment apparatus for a fluid according to claim 1 or 2, further comprising:
    an addition device for adding any of halogen ions and a compound containing halogen ions into the first fluid.

12. The coagulation treatment apparatus for a fluid according to claim 1 or 2, wherein the first and second fluids are wastewater resulting from a CMP process.

13. The coagulation treatment apparatus for a fluid according to claim 1 or 2, further comprising:
    a filter separating the coagulate from the second fluid.

14. The coagulation treatment apparatus for a fluid according to claim 13, wherein the filter comprises a polymer filter that passes the second fluid through and collects the coagulate on the surface of the polymer filter.

15. The coagulation treatment apparatus for a fluid according to claim 14, further comprising:
    a second filter that forms on the surface of the polymer filter from the collected coagulate and that passes the second fluid through.

16. The coagulation treatment apparatus for a fluid according to claim 2, wherein the device is an addition device introducing the metal belonging to Group 8 of the periodic table or the ions of the metal.

17. The coagulation treatment apparatus for a fluid according to claim 2, wherein the second device is a pump re-circulating the coagulate.

18. The coagulation treatment apparatus for a fluid according to claim 1 or 2, wherein the metal belonging to Group 8 of the periodic table is selected from the group consisting of iron, cobalt, nickel, and mixtures thereof.

19. The coagulation treatment apparatus for a fluid according to claim 1 or 2,
wherein the pretreatment device heats the first fluid to concentrate the amount of silica in the first fluid.

20. The coagulation treatment apparatus for a fluid according to claim 1 or 2, further comprising:

a filtration device filtrating the first fluid in the pretreatment device to concentrate the amount of silica in the first fluid.

21. The coagulation treatment apparatus for a fluid according to claim 1 or 2, wherein the pretreatment device removes foreign substances from the first fluid prior to the tank housing the first fluid.

* * * * *